United States Patent
Shi et al.

(10) Patent No.: US 11,559,071 B2
(45) Date of Patent: *Jan. 24, 2023

(54) N-ACYL-AMINO ACID DERIVATIVES FOR IMPROVEMENT OF THE FLAVOUR PROFILE OF EDIBLE COMPOSITIONS

(71) Applicant: GIVAUDAN SA, Vernier (CH)

(72) Inventors: Feng Shi, Mason, OH (US); Harry Renes, Almere (NL); Esther Van Ommeren, Almere (NL); Susanna Magdalena Vorster, Bussum (NL); Yili Wang, Mason, OH (US); Adri De Klerk, Made (NL); Jenifer Augelli, Cincinnati, OH (US)

(73) Assignee: GIVAUDAN SA, Vernier (CH)

( * ) Notice: Subject to any disclaimer, the term of this patent is extended or adjusted under 35 U.S.C. 154(b) by 164 days.

This patent is subject to a terminal disclaimer.

(21) Appl. No.: 17/068,367

(22) Filed: Oct. 12, 2020

(65) Prior Publication Data
US 2021/0022376 A1  Jan. 28, 2021

Related U.S. Application Data

(63) Continuation of application No. 14/386,126, filed as application No. PCT/EP2013/034403 on Mar. 28, 2013, now Pat. No. 10,856,563.

(60) Provisional application No. 61/617,796, filed on Mar. 30, 2012.

(51) Int. Cl.
| | |
|---|---|
| *A23L 7/161* | (2016.01) |
| *A23L 2/56* | (2006.01) |
| *A23F 5/24* | (2006.01) |
| *A23C 11/10* | (2021.01) |
| *C12G 3/06* | (2006.01) |
| *A23L 27/21* | (2016.01) |
| *A23L 27/00* | (2016.01) |
| *A23L 27/50* | (2016.01) |
| *A23L 23/10* | (2016.01) |
| *A23L 19/18* | (2016.01) |
| *A23L 27/60* | (2016.01) |
| *A23L 19/20* | (2016.01) |
| *A23L 11/50* | (2021.01) |
| *A23L 11/65* | (2021.01) |

(52) U.S. Cl.
CPC ............ *A23L 7/161* (2016.08); *A23C 11/103* (2013.01); *A23F 5/243* (2013.01); *A23L 2/56* (2013.01); *A23L 11/50* (2021.01); *A23L 11/65* (2021.01); *A23L 19/18* (2016.08); *A23L 19/20* (2016.08); *A23L 23/10* (2016.08); *A23L 27/21* (2016.08); *A23L 27/50* (2016.08); *A23L 27/60* (2016.08); *A23L 27/84* (2016.08); *C12G 3/06* (2013.01); *A23V 2002/00* (2013.01)

(58) Field of Classification Search
CPC .......... A23L 7/161; A23L 23/20; A23L 19/18; A23L 19/20; A23L 27/60; A23L 27/21; A23L 27/50; A23L 27/84; A23L 11/50; A23L 11/65; A23L 2/56; A23C 11/103; A23F 5/243; C12G 3/06; A23V 2002/00
USPC ........ 426/537, 534, 536, 548, 634, 649, 650
See application file for complete search history.

(56) References Cited

U.S. PATENT DOCUMENTS

| | | | | |
|---|---|---|---|---|
| 10,582,715 B2 * | 3/2020 | Shi | ...................... | A23C 19/0925 |
| 10,836,712 B2 * | 11/2020 | Shi | ........................ | C07C 235/74 |
| 10,856,563 B2 * | 12/2020 | Shi | .......................... | A23L 23/10 |

* cited by examiner

Primary Examiner — Leslie A Wong
(74) Attorney, Agent, or Firm — Norris McLaughlin PA

(57) ABSTRACT

The use of a compound according to formula (I) or the edible salts thereof in an edible composition to mask or modulate an undesired taste or off-taste contained in the edible composition

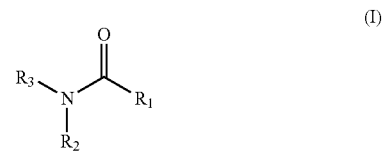

(I)

wherein
$R_1$ is an alkyl residue containing 6 to 20 carbon atoms, or an alkene residue containing from 9 to 25 carbon atoms with 1 to 6 double bonds, $R_1$ together with the carbonyl group to which it is attached is a residue of a carboxylic acid, and $NR_2R_3$, in which $R_3$ is H or together with $R_2$ and the N-atom to which they are attached, a 5-membered ring, is a residue of an amino acid, in particular a proteinogenic amino acid, ornithine, gamma-aminobutyric acid or beta alanine, or a 1-amino cycloalkyl carboxylic acid.

17 Claims, No Drawings

N-ACYL-AMINO ACID DERIVATIVES FOR IMPROVEMENT OF THE FLAVOUR PROFILE OF EDIBLE COMPOSITIONS

This is a Continuation application of U.S. Ser. No. 14/386,126 filed 18. Sep.2014, now U.S. Pat. No. 10,856,563, issued 08. Dec.2020, which in turn was an application filed under 35 USC 371 of PCT/US2013/034403, and claimed the priority to U.S. 61/617796 filed 30.March.2012. The present application claims all priority benefits of the foregoing identified applications, as well as incorporating the entirety of their disclosures herein by reference thereto.

The present invention relates to taste-masking compounds, as well as flavour compositions and edible compositions containing same. In particular, the invention relates to taste-masking compounds and compositions useful for suppressing, eliminating or reducing undesirable tastes or off-tastes of edible compositions or of ingredients contained in edible compositions.

Off-taste is a common and costly problem for the food industry. For many years, the use of salt, sugar or spices helped mask off-tastes. However, the relatively recent tendency to reduce or eliminate basic ingredients like salt or sugar from food for reasons related to health and wellness, as well as the increased use of functional ingredients and nutraceuticals, has increased the need for new taste-masking or taste-modulating technologies.

Undesired tastes or off tastes can be intrinsically present in edible compositions. The most common examples are bitter tastes from vegetables, such as brussel sprouts or broccoli, or sourness in certain foods, such as orange juice or yogurt. There are many naturally occurring bioactive compounds that although eliciting bitterness, nevertheless have positive health effects. These compounds include flavanoids, polyphenols, peptides, minerals or terpenes. Other sources of off-tastes can be related to microbial metabolites, enzymatic degradation, or to the effects of heat or oxidation on edible compositions. Undesired tastes or off-tastes can also be introduced into edible compositions as the result of adding certain ingredients such as vitamins, minerals, amino acids, proteins, peptides or antioxidants, as well as sugar and salt-substitutes. All of these ingredients might be employed as additives with the intention of improving the health and safety of food or for reasons of nourishment, but they can also carry with them undesirable tastes or off-tastes.

In the case of sugar replacers, the tastes they impart can present different temporal profiles, flavour-profiles or adaptation behaviours compared with the sugars which they replace, in whole or in part. For example, the sweet taste of natural and synthetic high-impact sweeteners, is generally slower in onset and longer in duration than the sweet taste produced by sugar and this can change the taste balance of an edible composition containing them. This can create unbalanced temporal profiles and/or flavour profiles. In addition to the difference in temporal profile, high-potency sweeteners generally exhibit lower maximal response than sugar; off tastes including bitter, metallic, cooling, astringent, licorice-like taste and/or sweetness, which diminishes on iterative tasting.

Changing a sweetener in a flavour composition can require the re-balancing of the composition and other taste components. If the taste profile of natural and synthetic high-impact sweeteners could be modified to be more sugar-like, the type and variety of compositions that may be prepared with that sweetener would be expanded significantly and an ever greater range of edible compositions would meet with increased consumer acceptance.

Effectively masking undesirable tastes or off-tastes, and/or improving flavour profiles in edible compositions is key to consumer acceptance of many edible compositions.

Compounds have now been found that are capable of masking undesirable or off-tastes associated with edible compositions. In particular, although not exclusively, compounds and compositions have been found that suppress, reduce or eliminate undesirable tastes or off-tastes associated with the use of high impact sweeteners, more particularly the compounds and compositions suppress, reduce or eliminate the lingering sweet after-taste associated with the use of high impact sweeteners, such that edible compositions containing said sweeteners have a more sugar-like temporal and flavour profile. Furthermore, the taste of high impact sweeteners used in edible compositions can build or aggregate over the course of consumption and compounds and compositions of the present invention may help to suppress, reduce or eliminate this effect.

The invention provides in a first aspect the use of a compound according to formula (I) or the edible salts thereof in an edible composition to mask or modulate an undesired taste or off-taste contained in the edible composition

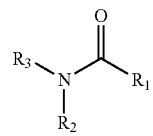

(I)

wherein
$R_1$ is an alkyl residue containing 6 to 20 carbon atoms, or an alkene residue containing from 9 to 25 carbon atoms with 1 to 6 double bonds, $R_1$ together with the carbonyl group to which it is attached is a residue of a carboxylic acid, and $NR_2R_3$, in which $R_3$ is H or together with $R_2$ and the N-atom to which they are attached, a 5-membered ring, is a residue of an amino acid, in particular a proteinogenic amino acid, ornithine, gamma-aminobutyric acid or beta alanine, or a 1-amino cycloalkyl carboxylic acid.

Edible salts include those typically employed in the food and beverage industry and include chlorides, sulphates, phosphates, gluconates, sodium, citrates, carbonates, acetates and lactates.

The proteinogenic amino acids are alanine (Ala), cysteine (Cys), aspartic acid (Asp), phenylalanine (Phe), glutamic acid (Glu), histidine (His), isoleucine (Ile), lysine (Lys), leucine (Leu), methionine (Met), asparagines (Asn), glutamine (Gln), arginine (Arg), serine (Ser), theronine (Thr), valine (Val), tryptophan (Trp), tyrosine (Tyr), proline (Pro) or glycine (Gly).

The three letter codes in parentheses are common abbreviations used in relation to the amino acids and they shall be used henceforth.

The carboxylic acids can likewise be represented by abbreviations. Henceforth, the carboxylic acid residues may be referred to by the abbreviation Cn, wherein "n" represents the number of carbon atoms in the residue. For example, the residue of an 18 carbon acid may be abbreviated as C18. Still further, if the 18 carbon acid is saturated, e.g. stearic acid. It may be abbreviated as C18:0 (because it contains zero double bonds), whereas an 18 carbon acid having one double bond—e.g. oleic acid—may be abbreviated as C18:1. Still further, if the C18 acid has a single double bond in the cis configuration, then it can be abbreviated as C18:1c. Similarly, if the double bond was in the trans configuration, then the abbreviation becomes C18:1t.

The compounds of formula (I) can also be represented in terms of these abbreviations. For example, the compound of formula (I) consisting of a residue of a C18 carboxylic acid and a residue of the amino acid Proline can be represented by the abbreviation C18-Pro. For simplicity the compounds of formula (I) henceforth may be represented in this abbreviated form.

As is evident from the above formula (I), an amino nitrogen atom on the amino acid residue is bound to a carbonyl carbon atom of the carboxylic acid residue to form an amide linkage. Some amino acids have more than one amine groups, and the amide linkage can be formed at any of these amino groups. However, in relation to any of the compounds specifically described hereinbelow, if the amino acid residue contains more than one amino group, the linkage is made at the alpha amino group.

In a particular embodiment of the present invention the carboxylic acid residue is a residue of a fatty acid.

The fatty acid residue may be the residue of a C8 to C22 fatty acid. The fatty acid may be mammalian or non-mammalian. A mammalian fatty acid is a natural or synthetic fatty acid that is identical in structure to one naturally produced in a mammal, including, but not limited to, myristic acid, palmitic acid, stearic acid, oleic acid, linoleic acid, linolenic acid, eicosatrienoic acid, arachidonic acid, eicosapentaenoic acid, and docosatetraenoic acid. A non-mammalian fatty acid is a natural or synthetic fatty acid not normally produced by a mammal, including, but not limited to, pentadecanoic acid; heptadecanoic acid; nonadecanoic acid; heneicosanoic acid; 9-trans-tetradecenoic acid; 10-trans-pentadecenoic acid; 9-trans-hexadecenoic acid; 10-trans-heptadecenoic acid; 10-trans-heptadecenoic acid; 7-trans-nonadecenoic acid; 10,13-nonadecadienoic acid; 11-trans-eicosenoic acid; and 12-transhenicosenoic acid.

The fatty acid residues may be saturated or unsaturated. If they are unsaturated, it is preferred that they have 1, 2 or 3 double bonds, which may in cis- or trans-configuration.

More particularly, the preferred fatty acid residues are C16 to C18, and may be saturated or unsaturated.

The skilled person will appreciate, however, that natural sources of these fatty acids, for example almond oil, avocado oil, castor oil, coconut oil, corn oil, cottonseed oil, olive oil, peanut oil, rice bran oil, safflower oil, sesame oil, soybean oil, sunflower oil, palm oil and canola oil, each consist of a complex mixture of fatty acids. For example, safflower oil is predominately a source of the C18:2 linoleic acid, nevertheless it may contain other fatty acids, such as linolenic acid (C18:3) and palmitic acid (C16:0), amongst others. Accordingly, reference herein to a compound containing a particular fatty acid residue, for example a residue of C18 fatty acid, may be a reference to a pure, or substantially pure C18 fatty acid residue, or it may relate to a mixture of fatty acid residues with the predominant residue being a C18 residue. Preferred fatty acid residues are C16 to C18.

Compounds of formula (I) may contain chiral atoms, and as such they may exist in racemic form, as a mixture of stereoisomers or as resolved as single isomers. The use of the term "a compound of formula (I)" may refer to both mixtures of isomers or resolved single isomers.

In particular, the compounds of formula (I) may contain the residue of D- or L-amino acids.

The compounds of formula (I) formula (I) can be formed by known methods using commercially available starting materials, reagents and solvents, and a detailed discussion is not warranted here. In an embodiment of the present invention, the conjugates can be formed by the reaction of an amino acid with a carboxylic acid halide, e.g. a chloride under basic conditions in aqueous conditions such as a water/THF solvent system. Yield and reaction times may be improved by applying heat to the reaction mixture. In an alternative embodiment, a carboxylic acid can be reacted with an amino acid in dioxane in the presence of DCC (dicyclohexylcarbodiimide) and 1-hydroxypyrrolidine-2,5-dione.

In yet another embodiment, an amino acid alkyl ester may be reacted with a carboxylic acid chloride under basic conditions in an aqueous-based solvent, such as a water/THF solvent system. Thereafter, the ester can be hydrolysed carefully without affecting the amide bond in basic methanol water solution In yet another embodiment, a carboxylic acid and an amino acid alkyl ester can be reacted in dioxane in the presence of DCC (dicyclohexylcarbodiimide) and 1-hydroxypyrrolidine-2,5-dione. The ester can be hydrolysed carefully without affecting the amide bond in dilute basic methanol water solution In yet another embodiment, a (mixed) anhydride of a carboxylic acid is reacted with an amino acid in dioxane.

In yet another embodiment, a carboxylic acid alkyl ester can be reacted with an amino acid in dioxane In still another embodiment, an amino acid alkyl ester is reacted with a triglyceride, optionally in the presence of a co-solvent. The amino acid ester thus formed is then hydrolysed according to a method described above.

In yet another embodiment, an amino acid is reacted with a triglyceride, optionally in the presence of a co-solvent.

In yet another embodiment, an amino acid is reacted with a triglyceride in the presence of a lipase, esterase, peptidase, amidase or acylase, optionally in the presence of a cosolvent and/or water.

In yet another embodiment a carboxylic acid alkyl ester is reacted with an amino acid in the presence of a lipase or an acylase, optionally in the presence of a co-solvent and/or water.

In an embodiment of the present invention there is provided compounds of formula (I) represented by the following formula (Ia)

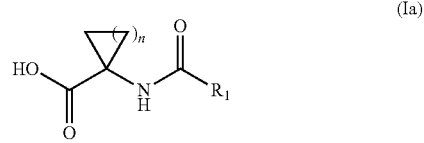

(Ia)

their edible salts, and their use in edible compositions wherein
$R_1$, is hereinabove defined, and
n is 1, 2, 3 or 4.

The preferred compounds are those wherein "n" is 1.

The amino acid residue disclosed in the above formula may be abbreviated as "ACCA".

The compounds include C8-ACCA, C9-ACCA, C10-ACCA, C12-ACCA, C14-ACCA, C16-ACCA, C18-ACCA, C20-ACCA and C22-ACCA.

The compounds include C8-ACCA, C9-ACCA, C10-ACCA, C12-ACCA, C14-ACCA, C16-ACCA, C18-ACCA, C20-ACCA and C22-ACCA, wherein the carboxylic acid residue is saturated.

The compounds include C8-ACCA, C9-ACCA, C10-ACCA, C12-ACCA, C14-ACCA, C16-ACCA, C18-ACCA, C20-ACCA and C22-ACCA, wherein the carboxylic acid residue is unsaturated and contains 1, 2 or 3 double bonds. The double bonds may be in cis-configuration, trans-configuration or a mixture of cis- and trans-configuration.

The compounds include those specified above wherein the cycloalkane ring in the amino acid residue is cyclopropane (n=1).

Particularly preferred compounds are N-palmitoyl 1-amino-cyclopropyl carboxylic acid (C16:0-ACCA), N-stearoyl 1-amino-cyclopropyl carboxylic acid (C18:0-ACCA), N-linoleoyl 1-amino-cyclopropyl carboxylic acid (C18:2-ACCA), N-linolenoyl 1-amino-cyclopropyl carboxylic acid (C18:2-ACCA), N-oleoyl 1-amino-cyclopropyl carboxylic acid (C18:1-ACCA), N-(9-palmitenoyl) 1-amino-cyclopropyl carboxylic acid (C16:1-ACCA), N-decanoyl 1-amino-cyclopropyl carboxylic acid (C10:0-ACCA) and N-geranoyl 1-amino-cyclopropyl carboxylic acid (C10:2-ACCA).

The present invention provides in another embodiment the compounds of formula (I) represented by compounds of the following formula (Ib)

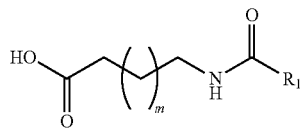

(Ib)

and their edible salts, and their use in edible compositions wherein
$R_1$, is hereinabove defined, and
m is 0 or 1.

It will be apparent to the person skilled in the art that when m is 1, the amino acid residue is a residue of gamma amino butyric acid (GABA), whereas when m is 0, the amino acid residue is a residue of beta-alanine (Beta Ala). Both the compounds of formula (I) wherein m is 1 and the amino acid residue is a residue of GABA, and the compounds of formula (I) wherein m is 0 and the amino acid residue is a residue of beta-alanine, their edible salts, as well as their use in edible compositions, are all embodiments of the present invention.

These compounds are particularly useful to incorporate into an edible product to impart a remarkable mouthfeel, body and enhanced fat perception; or an enhanced umami or salt taste; or a cooling and richness. They are particularly useful in applications low in fat, salt and umami. They are also useful in fat-free formulations such as beverages and oral care applications. They also find use in dairy applications and in vanilla, cocoa and chocolate.

The compounds include C8-GABA, C9-GABA, C10-GABA, C12-GABA, C14-GABA, C16-GABA, C18-GABA, C20-GABA and C22-GABA.

The compounds include C8-GABA, C9-GABA, C10-GABA, C12-GABA, C14-GABA, C16-GABA, C18-GABA, C20-GABA and C22-GABA, wherein the carboxylic acid residue is saturated.

The compounds include C8-GABA, C9-GABA, C10-GABA, C12-GABA, C14-GABA, C16-GABA, C18-GABA, C20-GABA and C22-GABA, wherein the carboxylic acid residue is unsaturated and contains 1, 2 or 3 double bonds. The double bonds may be in cis-configuration, trans-configuration or a mixture of cis- and trans-configuration.

Particularly preferred compounds include C10-GABA, C12-GABA, more particularly C12:1-GABA, C14-GABA, C16-GABA, more particularly C16:1-GABA, C18-GABA, more particularly C18:1-GABA, still more particularly C18:1c-GABA and C18:1t-GABA. Most preferred is a compound C18:2-GABA.

The compounds include C8-Beta Ala, C9-Beta Ala, C10-Beta Ala, C12-Beta Ala, C14-Beta Ala, C16-Beta Ala, C18-Beta Ala, C20-Beta Ala and C22-Beta Ala.

The compounds include C8-Beta Ala, C9-Beta Ala, C10-Beta Ala, C12-Beta Ala, C14-Beta Ala, C16-Beta Ala, C18-Beta Ala, C20-Beta Ala and C22-Beta Ala, wherein the carboxylic acid residue is saturated.

The compounds include C8-Beta Ala, C9-Beta Ala, C10-Beta Ala, C12-Beta Ala, C14-Beta Ala, C16-Beta Ala, C18-Beta Ala, C20-Beta Ala and C22-Beta Ala, wherein the carboxylic acid residue is unsaturated and contains 1, 2 or 3 double bonds. The double bonds may be in cis-configuration, trans-configuration or a mixture of cis- and trans-configuration.

A preferred compound is C18:2-Beta Ala.

The present invention provides in another embodiment the compounds of formula (I) represented by the following formula (Ic)

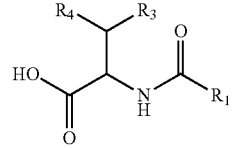

(Ic)

and their edible salts, and their use in edible compositions wherein
$R_1$, is hereinabove defined,
$R_3$ is hydrogen or methyl, and
$R_4$ is methyl, ethyl or iso-propyl.

Particular compounds are those in which $R_3$ is hydrogen and $R_4$ is iso-propyl; $R_3$ is methyl and $R_4$ is methyl; and $R_3$ is methyl and $R_4$ is ethyl. The skilled person will appreciate that the amino acid residue in which $R_3$ is hydrogen and $R_4$ is iso-propyl is the residue of Leucine (Leu); whereas the amino acid residue in which $R_3$ is methyl and $R_4$ is methyl is the residue of Valine (Val); and the amino acid residue in which $R_3$ is methyl and $R_4$ is ethyl is the residue of iso-Leucine (Ile).

The compounds in which $R_3$ is hydrogen and $R_4$ is iso-propyl; $R_3$ is methyl and $R_4$ is methyl; and $R_3$ is methyl and $R_4$ is ethyl, as well as their use in edible compositions, are all embodiments of the present invention.

These compounds are particularly useful to enhance authentic fruit profiles, They may also find use in fruit flavoured milk, yoghurt and ice creams.

The compounds include C8-Leu, C9-Leu, C10-Leu, C12-Leu, C14-Leu, C16-Leu, C18-Leu, C20-Leu and C22-Leu.

The compounds include C8-Leu, C9-Leu, C10-Leu, C12-Leu, C14-Leu, C16-Leu, C18-Leu, C20-Leu and C22-Leu, wherein the carboxylic acid residue is saturated.

The compounds include C8-Leu, C9-Leu, C10-Leu, C12-Leu, C14-Leu, C16-Leu, C18-Leu, C20-Leu and C22-Leu, wherein the carboxylic acid residue is unsaturated and contains 1, 2 or 3 double bonds. The double bonds may be in cis-configuration, trans-configuration or a mixture of cis- and trans-configuration.

Particular compounds bearing the Leu residue include N-palmitenoyl-L-leucine, N-palmitoyl-L-leucine, N-linolenoyl-L-leucine, N-linoleoyl-L-leucine and N-oleoyl-L-leucine.

The compounds include C8-Ile, C9-Ile, C10-Ile, C12-Ile, C14-Ile, C16-Ile, C18-Ile, C20-Ile and C22-Ile.

The compounds include C8-Ile, C9-Ile, C10-Ile, C12-Ile, C14-Ile, C16-Ile, C18-Ile, C20-Ile and C22-Ile, wherein the carboxylic acid residue is saturated.

The compounds include C8-Ile, C9-Ile, C10-Ile, C12-Ile, C14-Ile, C16-Ile, C18-Ile, C20-Ile and C22-Ile, wherein the carboxylic acid residue is unsaturated and contains 1, 2 or 3 double bonds. The double bonds may be in cis-configuration, trans-configuration or a mixture of cis- and trans-configuration.

A particularly preferred compound bearing the Ile residue is N-oleoyl-Ile.

The compounds include C8-Val, C9-Val, C10-Val, C12-Val, C14-Val, C16-Val, C18-Val, C20-Val and C22-Val.

The compounds include C8-Val, C9-Val, C10-Val, C12-Val, C14-Val, C16-Val, C18-Val, C20-Val and C22-Val, wherein the carboxylic acid residue is saturated.

The compounds include C8-Val, C9-Val, C10-Val, C12-Val, C14-Val, C16-Val, C18-Val, C20-Val and C22-Val, wherein the carboxylic acid residue is unsaturated and contains 1, 2 or 3 double bonds. The double bonds may be in cis-configuration, trans-configuration or a mixture of cis- and trans-configuration.

Particularly preferred compounds bearing the Val residue include N-palmitenoyl-L-valine, N-palmitoyl-L-valine, N-linolenoyl-L-valine, N-linoleoyl-L-valine and N-oleoyl-L-valine.

In another embodiment of the invention, there is provided compounds of formula (I) corresponding to the following formula (Id)

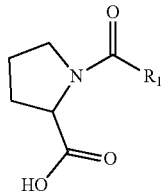

(Id)

their edible salts, and their use in edible compositions wherein $R_1$, is hereinabove defined.

The skilled person will appreciate that the amino acid residue in the compounds defined above is the proline residue (Pro).

These compounds are particularly effective to enhance juiciness and typical citrus authenticity. They find use particularly in powdered soft drinks and beverages, and also in dairy applications, such as fruit flavoured milk, yoghurt and ice creams.

The compounds include C8-Pro, C9-Pro, C10-Pro, C12-Pro, C14-Pro, C16-Pro, C18-Pro, C20-Pro and C22-Pro.

The compounds include C8-Pro, C9-Pro, C10-Pro, C12-Pro, C14-Pro, C16-Pro, C18-Pro, C20-Pro and C22-Pro, wherein the carboxylic acid residue is saturated.

The compounds include C8-Pro, C9-Pro, C10-Pro, C12-Pro, C14-Pro, C16-Pro, C18-Pro, C20-Pro and C22-Pro, wherein the carboxylic acid residue is unsaturated and contains 1, 2 or 3 double bonds. The double bonds may be in cis-configuration, trans-configuration or a mixture of cis- and trans-configuration.

Particularly preferred compounds bearing the Pro residue N-geranoyl-Pro, N-palmitoyl-Pro, N-palmiteneoyl-Pro, N-stearoyl-Pro, N-linoleoyl-Pro and N-linolenoyl-Pro.

In another embodiment of the invention, there is provided compounds of formula (I) corresponding to the following formula (Ie)

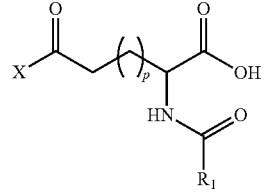

(Ie)

their edible salts, and their use in edible compositions wherein $R_1$, is hereinabove defined, X is OH or $NH_2$ and P is 0 or 1.

The skilled person will appreciate that when p is 0 and X is OH, the amino acid residue set forth in the above formula is a residue of aspartic acid, whereas when p is 1, and X is OH the residue is that of glutamic acid, whereas when p is 0 and X is $NH_2$, the residue is that of asparagine (Asn), and when p is 1 and X is $NH_2$, the residue is that of glutamine (Gln).

The compounds bearing an aspartic acid residue, the compounds bearing a glutamic acid residue, the compounds bearing an asparagine residue, and the compounds bearing a glutamine residue, as well as their edible salts, and their use in edible compositions, each represent particular embodiments of the present invention.

These compounds are particularly useful to enhance savoury character, mouthfeel and overall flavour performance, juiciness and salivation. They may find use in low salt, low umami and low fat as well as fruit flavour drinks as well as dairy applications.

The compounds include C8-Glu, C9-Glu, C10-Glu, C12-Glu, C14-Glu, C16-Glu, C18-Glu, C20-Glu and C22-Glu.

The compounds include C8-Glu, C9-Glu, C10-Glu, C12-Glu, C14-Glu, C16-Glu, C18-Glu, C20-Glu and C22-Glu, wherein the carboxylic acid residue is saturated.

The compounds include C8-Glu, C9-Glu, C10-Glu, C12-Glu, C14-Glu, C16-Glu, C18-Glu, C20-Glu and C22-Glu, wherein the carboxylic acid residue is unsaturated and contains 1, 2 or 3 double bonds. The double bonds may be in cis-configuration, trans-configuration or a mixture of cis- and trans-configuration.

Particularly preferred compounds bearing the Glu residue include N-geranoyl-Glu, N-palmitoyl-Glu, N-palmitenoyl-Glu, N-stearoyl-Glu, N-linoleoyl-Glu and N-linolenoyl-Glu.

The compounds include C8-Asp, C9-Asp, C10-Asp, C12-Asp, C14-Asp, C16-Asp, C18-Asp, C20-Asp and C22-Asp.

The compounds include C8-Asp, C9-Asp, C10-Asp, C12-Asp, C14-Asp, C16-Asp, C18-Asp, C20-Asp and C22-Asp, wherein the carboxylic acid residue is saturated.

The compounds include C8-Asp, C9-Asp, C10-Asp, C12-Asp, C14-Asp, C16-Asp, C18-Asp, C20-Asp and C22-Asp, wherein the carboxylic acid residue is unsaturated and contains 1, 2 or 3 double bonds. The double bonds may be in cis-configuration, trans-configuration or a mixture of cis- and trans-configuration.

Particularly preferred compounds bearing the Asp residue include N-geranoyl-Asp, N-palmitoyl-Asp, N-palmitenoyl-Asp, N-stearoyl-Asp, N-linoleoyl-Asp and N-linolenoyl-Asp.

The compounds include C8-Gln, C9-Gln, C10-Gln, C12-Gln, C14-Gln, C16-Gln, C18-Gln, C20-Gln and C22-Gln.

The compounds include C8-Gln, C9-Gln, C10-Gln, C12-Gln, C14-Gln, C16-Gln, C18-Gln, C20-Gln and C22-Gln, wherein the carboxylic acid residue is saturated.

The compounds include C8-Gln, C9-Gln, C10-Gln, C12-Gln, C14-Gln, C16-Gln, C18-Gln, C20-Gln and C22-Gln, wherein the carboxylic acid residue is unsaturated and contains 1, 2 or 3 double bonds. The double bonds may be in cis-configuration, trans-configuration or a mixture of cis- and trans-configuration.

Particularly preferred compounds bearing the Gln residue include N-geranoyl-Gln, N-palmitoyl-Gln, N-palmitenoyl-Gln, N-stearoyl-Gln, N-linoleoyl-Gln and N-linolenoyl-Gln.

The compounds include C8-Asn, C9-Asn, C10-Asn, C12-Asn, C14-Asn, C16-Asn, C18-Asn, C20-Asn and C22-Asn.

The compounds include C8-Asn, C9-Asn, C10-Asn, C12-Asn, C14-Asn, C16-Asn, C18-Asn, C20-Asn and C22-Asn, wherein the carboxylic acid residue is saturated.

The compounds C8-Asn, C9-Asn, C10-Asn, C12-Asn, C14-Asn, C16-Asn, C18-Asn, C20-Asn and C22-Asn, wherein the carboxylic acid residue is unsaturated and contains 1, 2 or 3 double bonds. The double bonds may be in cis-configuration, trans-configuration or a mixture of cis- and trans-configuration.

Particularly preferred compounds bearing the Asn residue include N-geranoyl-Asn, N-palmitoyl-Asn, N-palmitenoyl-Asn, N-stearoyl-Asn, N-linoleoyl-Asn and N-linolenoyl-Asn.

In another embodiment of the invention, there is provided compounds of formula (I) corresponding to the following formula (If)

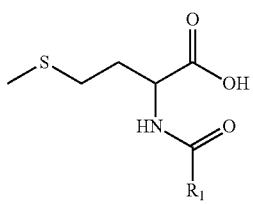

(If)

their edible salts, and their use in edible compositions wherein
$R_1$, is hereinabove defined.

The skilled person will appreciate that in the above formula the amino acid residue is the residue of methionine (Met).

These compounds are particularly effective to enhance juiciness and salivation, as well as the authenticity of fruits. They also are useful in soft drinks applications for their masking properties.

The compounds include C8-Met, C9-Met, C10-Met, C12-Met, C14-Met, C16-Met, C18-Met, C20-Met and C22-Met.

The compounds include C8-Met, C9-Met, C10-Met, C12-Met, C14-Met, C16-Met, C18-Met, C20-Met and C22-Met, wherein the carboxylic acid residue is saturated.

The compounds include C8-Met, C9-Met, C10-Met, C12-Met, C14-Met, C16-Met, C18-Met, C20-Met and C22-Met wherein the carboxylic acid residue is unsaturated and contains 1, 2 or 3 double bonds. The double bonds may be in cis-configuration, trans-configuration or a mixture of cis- and trans-configuration.

Particularly preferred compounds bearing the Met residue include N-geranoyl-Met, N-palmitoyl-Met, N-palmitenoyl-Met, N-stearoyl-Met, N-linoleoyl-Met and N-linolenoyl-Met.

In another embodiment of the invention, there is provided compounds of formula (I) corresponding to the following formula (Ig)

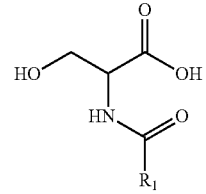

(Ig)

their edible salts, and their use in edible compositions wherein
$R_1$, is hereinabove defined.

The skilled person will appreciate that in the above formula the amino acid residue is the residue of serine (Ser).

These compounds find particular use in low salt, umami and fat, fruit flavoured beverages and/or dairy applications.

The compounds include C8-Ser, C9-Ser, C10-Ser, C12-Ser, C14-Ser, C16-Ser, C18-Ser, C20-Ser and C22-Ser.

The compounds include C8-Ser, C9-Ser, C10-Ser, C12-Ser, C14-Ser, C16-Ser, C18-Ser, C20-Ser and C22-Ser, wherein the carboxylic acid residue is saturated.

The compounds include C8-Ser, C9-Ser, C10-Ser, C12-Ser, C14-Ser, C16-Ser, C18-Ser, C20-Ser and C22-Ser wherein the carboxylic acid residue is unsaturated and contains 1, 2 or 3 double bonds. The double bonds may be in cis-configuration, trans-configuration or a mixture of cis- and trans-configuration.

Particularly preferred compounds bearing the Ser residue include N-palmitoyl-Ser, N-palmitenoyl-Ser, N-stearoyl-Ser, N-linoleoyl-Ser and N-linolenoyl-Ser.

Other compounds useful in the present invention include:
N-octanoyl-L-phenylalanine, N-eicosanoyl-L-phenylalanine, N-palmitoleyl-L-phenylalanine, N-palmitoyl-L-phenylalanine, N-linolenoyl-L-phenylalanine, N-linoleoyl-L-phenylalanine, N-oleoyl-L-phenylalanine, N-SDA-L-phenylalanine, N-DPA-L-phenylalanine, and N-tetracosahexaenyl-L-phenylalanine;
N-palmitoyl-L-alanine, N-linolenoyl-L-alanine, N-linoleoyl-L-alanine;
N-palmitoyl-L-tyrosine, N-linoleoyl-L-tyrosine, N-oleoyl-L-tyrosine, N-linolenoyl-L-tyrosine;
N-palmitoyl-L-tryptophan, N-linolenoyl-L-tryptophan, N-linoleoyl-L-tryptophan; and
N-linoleoyl-glycine.

Preferably, compounds of formula (I) do not include the compounds C12:1-Ala; C12:1-Gly; C12:2-Ala; C18:3-Ala; and C16:1-Ala, particularly when a double bond is in the cis-configuration; C18:3-Ala; C20:5-Ala; C16:0-Ala; C22:0-Gly, in particular C22:6-Gly; C18:2-Leu; C23:1-Leu; C18:1-Ile; C8:0-Glu; C12:0-Asp; C18:1-Ser; and C20:4-Ser.

The undesirable taste or off-taste may be caused by the presence of one or more ingredients contained with an edible composition, or which has been added to an edible composition. A non-exhaustive list of ingredients that might cause undesirable tastes or off-tastes include, but are not limited to flavanoids, polyphenols, peptides, minerals, terpenes, or functional ingredients such as caffeine, taurine, carnitine, glucorolactone, guarana, vitamins, minerals, amino acids, proteins or protein analogs, peptides or antioxidants, sugar substitutes, such as natural or synthetic high intensity sweeteners, dairy substitutes (soy, rice), pharmacological actives (both Rx and OTC), enzyme modified cheese, oral care actives (such as mouthwash and toothpaste, or ingredients that may be found in oral care products such as chlorohexidine (gluconate), cetyl pyridinium chloride, tego-betaine and metal salts such as stannous salts and zinc salts), whey, casein, tannins, coffee and tea products, preservatives, such as sodium benzoate and potassium sorbate, and the like.

In a particular embodiment of the present invention compounds of formula (I) are used to suppress, reduce or eliminate undesirable tastes or off-tastes associated with the use of high impact sweeteners.

In another particular embodiment of the present invention compounds of formula (I) are used to suppress, reduce or eliminate undesirable tastes or off-tastes associated with the presence of proteins, in particular soy proteins.

As used herein, taste-modulation or taste masking refers to the capacity of a compound of formula (I) to reduce or eliminate undesirable taste or off-taste of an edible composition, or of any ingredient that might be contained in an edible composition that might cause undesirable tastes or off-tastes, which include, but are not limited to flavanoids, polyphenols, peptides, minerals, terpenes, or functional ingredients such as caffeine, taurine, carnitine, glucorolactone, guarana, vitamins, minerals, amino acids, proteins or protein analogs, peptides or antioxidants, sugar substitutes, such as natural or synthetic high intensity sweeteners, dairy substitutes (soy, rice), pharmacological actives (both Rx and OTC), enzyme modified cheese, oral care actives (such as mouthwash and toothpaste, or ingredients that may be found in oral care products such as chlorohexidine (gluconate), cetyl pyridinium chloride, tego-betaine and metal salts such as stannous salts and zinc salts), whey, casein, tannins, coffee and tea products, preservatives, such as sodium benzoate and potassium sorbate, and the like.

Taste modulation may also relate to the capacity of a compound of formula (I) to alter the different temporal profiles, flavour-profiles or of the adaptation behaviour of edible compositions, or materials contained in said edible compositions.

In particular, in relation to artificial or natural high impact sweeteners, the compounds of formula (I), can reduce or eliminate the off-notes associated with these sweeteners. More particularly, these high impact sweeteners exhibit different temporal profiles, and generally exhibit lower maximal response compared to sugar; they also have off tastes including bitter, metallic, cooling, astringent, licorice-like taste and/or sweetness which diminishes on iterative tasting. The compound of formula (I) or flavour composition containing same can eliminate or reduce these effects such that the high impact sweeteners assume more sugar-like properties.

Still more particularly, the compound of formula (I) can reduce the lingering sweetness that is characteristic of said high impact sweeteners.

In another aspect of the invention there is provided an edible composition comprising a compound of formula (I) as herein above described.

In an embodiment of the present invention the edible composition comprises a compound of formula (I) and one or more ingredients having an undesirable or off-taste associated with its use.

Said ingredient may be selected from the group consisting of flavanoids, polyphenols, peptides, minerals, terpenes, or functional ingredients such as caffeine, taurine, carnitine, glucorolactone, guarana, vitamins, minerals, amino acids, proteins, in particular soy proteins or protein analogs, peptides or antioxidants, sugar substitutes, such as natural or synthetic high intensity sweeteners, dairy substitutes (soy, rice), pharmacological actives (both Rx and OTC), enzyme modified cheese, oral care actives (such as mouthwash and toothpaste, or ingredients that may be found in oral care products such as chlorohexidine (gluconate), cetyl pyridinium chloride, tego-betaine and metal salts such as stannous salts and zinc salts), whey, casein, tannins, coffee and tea products, preservatives, such as sodium benzoate and potassium sorbate, and the like.

The quantities in which compounds of formula (I) may be added to edible compositions may vary within wide limits and depend, inter alia, on the nature of the edible compositions, on the particular desired taste-modifying effect, as well as the nature and concentration of the ingredient or ingredients in the edible compositions that are responsible for the particular unwanted taste that must be eliminated, suppressed or reduced. It is well within the purview of the person skilled in the art to decide on suitable quantities of compounds of formula (I) to incorporate into an edible composition depending on the end use and effect required.

Typical non-limiting concentrations of compounds of formula (I) employed in edible compositions are 1 ppb to 10 ppm, more particularly 1 ppb to 8 ppm, more particularly, 10 ppb-5 ppm.

The compound of formula (I) may added as a single ingredient to an edible composition. Alternatively, it may be added to an edible composition as part of a flavour composition containing one or more additional ingredients known in the art.

Despite their interesting organoleptic properties, nevertheless, applicant found that formulating the compounds of formula (I) was not a trivial matter. The discovered potency of the compounds suggested that they could be employed at very low levels in flavour applications, and so for ease of handling, mixing and processing with other ingredients, although it is possible to use the compounds in neat form, it is desirable to extend or add volume to the physical form of the compounds by incorporating them into a suitable vehicle, for example a diluent, such as a solvent. However, the compounds are solids or viscous oils at ambient temperatures, and have very limited solubility in water. Applicant found that an at least about 0.01% stock solution, more particularly about 0.01-1% stock solution of a compound of formula (I) achieved a balance regarding acceptable solvent levels for ease of handling and mixing, and the desire to limit the amount of solvent that would have to be removed from the stock solution when further processing of the compounds in flavour compositions and edible compositions for reasons of palatability, efficiency, cost and the like.

Applicant found that suitable solvents for the stock solution include ethanol, triacetine, glycerol and miglyol.

In order to aid in the process of solubilization and produce a stock solution and minimize the amount of solvent, it is preferred to use compounds of the formula (I) formed from a mixture of carboxylic acids, rather than a pure carboxylic acid.

Accordingly, the invention provides in another of its aspects an at least about 0.01% stock solution, more particularly about 0.01-1% stock solution of a compound of formula (I).

The stock solution may contain other materials such as carrier materials and/or adjuvants more fully described below. In a particular embodiment, the stock solution contains an anti-oxidant selected from the group consisting of vitamin C, vitamin E, rosemary extract, antrancine, butylated hydroxyanisole (BHA) and butylated hydroxytoluene (BHT). Anti-oxidants are preferably employed to prevent, or significantly reduce, generation of volatile off notes as a result of degradation of the compounds of formula (I). Anti-oxidants are particularly preferred when the compounds of formula (I) bear a residue of an unsaturated fatty acid. Anti-oxidants are particularly preferred if the fatty acid residue contains more than 1 double bond. Determination of an effective amount of anti-oxidant is within the purview of the skilled person, however amounts in the range of about 10 ppm to 1000 ppm based on the weight of the stock solution may be present.

In another aspect of the present invention there is provided a flavour composition comprising
  i) a compound according to formula (I)
  ii) at least one flavour co-ingredient;
  iii) optionally a carrier material; and
  iv) optionally at least one adjuvant:
  v) optionally an ingredient that imparts an undesirable or off-taste.

In preparing the flavour compositions of the present invention, the compounds of formula (I) may be employed in any physical form. They may be used in neat form, in the form of a stock solution described above; they may be used in the form of an emulsion; or they may be used in a powder form. If the compounds of formula (I) are presented in the form of a powder, the powder form can be produced by a dispersive evaporation process, such as a spray drying process as is more fully described below. The powder form may be prepared by subjecting a liquid formulation containing a compound of formula (I) to a dispersive evaporation process. The liquid formulation may comprise a solution, suspension or emulsion comprising the compound of formula (I). In particular, the liquid formulation may take the form of the stock solution described hereinabove. The liquid formulation may contain other ingredients such as a carrier material and/or an adjuvant as described more fully below.

A powder comprising a compound of formula (I) forms another aspect of the present invention.

The compounds of formula (I) may in incorporated into an edible composition alone, or in the form of a flavour composition comprising one or more flavour co-ingredients.

A flavour composition comprising a compound according to the formula (I) forms another aspect of the present invention.

In an embodiment of the present invention, the flavour formulation comprises a compound of formula (I) and at least one flavour co-ingredient.

By the term "flavour co-ingredient" is an ingredient that is able to contribute or impart in a positive or pleasant way the taste of an edible composition. All manner of flavour co-ingredients may be employed in a composition according to the present invention.

The flavour co-ingredients may be sugars, fats, salt (e.g. sodium chloride), MSG, calcium ions, phosphate ions, organic acids, proteins, purines and mixtures thereof.

In a particular embodiment, sugars are present in amounts of 0.001% to 90%, more particularly 0.001% to 50%, still more particularly 0.001% to 20% based on the total weight of an edible composition.

In a particular embodiment, fats are present in amounts of 0.001% to 100%, more particularly 0.001% to 80%, more particularly 0.001% to 30%, still more particularly 0.001% to 5% based on the total weight of an edible composition. In a particular embodiment, salt (e.g. sodium chloride) is present in amounts of 0.001% to 20%, more particularly 0.001% to 5% based on the total weight of an edible composition.

In a particular embodiment, MSG is present in amounts of 0.001% to 2% based on the total weight of an edible composition.

In a particular embodiment, calcium is present in amounts of 0.001% to 50% more particularly 0.001% to 20%, still more particularly 0.001% to 1% based on the total weight of an edible composition.

In a particular embodiment, organic acids are present in amounts of 0.001% to 10%, more particularly 0.001% to 7% based on the total weight of an edible composition.

Types of organic acids include citric, malic, tartaric, fumaric, lactic, acetic and succinic. Types of edible compositions containing organic acids include beverages, such as carbonated soft drink beverages, still beverages, Juices, powdered soft drinks, liquid concentrates, alcoholic beverages and functional beverages.

In a particular embodiment, phosphorus is present in an amount up to 0.5% by weight of an edible composition. Typically phosphorus will be present as a phosphate or as phosphoric acid.

In a particular embodiment, purines are present in an amount up to 0.5% by weight of an edible composition. The term "purines" include ribonucleotides such as IMP and GMP.

Flavour co-ingredients include, but not limited, to natural flavours, artificial flavours, spices, seasonings, and the like. Co-ingredients include synthetic flavour oils and flavouring aromatics and/or oils, oleoresins, essences, distillates, and extracts derived from plants, leaves, flowers, fruits, and so forth, and combinations comprising at least one of the foregoing.

Flavour oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil; useful flavouring agents include artificial, natural and synthetic fruit flavours such as vanilla, and citrus oils including lemon, orange, lime, grapefruit, yazu, sudachi, and fruit essences including apple, pear, peach, grape, blueberry, strawberry, raspberry, cherry, plum, prune, raisin, cola, guarana, neroli, pineapple, apricot, banana, melon, apricot, ume, cherry, raspberry, blackberry, tropical fruit, mango, mangosteen, pomegranate, papaya and the like.

Additional exemplary flavours imparted by a flavouring agent include a milk flavour, a butter flavour, a cheese flavour, a cream flavour, and a yogurt flavour; a vanilla flavour; tea or coffee flavours, such as a green tea flavour, an oolong tea flavour, a tea flavour, a cocoa flavour, a chocolate flavour, and a coffee flavour; mint flavours, such as a peppermint flavour, a spearmint flavour, and a Japanese mint flavour; spicy flavours, such as an asafetida flavour, an ajowan flavour, an anise flavour, an angelica flavour, a fennel flavour, an allspice flavour, a cinnamon flavour, a chamomile flavour, a mustard flavour, a cardamom flavour, a caraway flavour, a cumin flavour, a clove flavour, a pepper flavour, a coriander flavour, a sassafras flavour, a savoury flavour, a Zanthoxyli Fructus flavour, a perilla flavour, a juniper berry flavour, a ginger flavour, a star anise flavour, a horseradish flavour, a thyme flavour, a tarragon flavour, a dill flavour, a capsicum flavour, a nutmeg flavour, a basil flavour, a marjoram flavour, a rosemary flavour, a bayleaf flavour, and a wasabi (Japanese horseradish) flavour; a nut flavour such as an almond flavour, a hazelnut flavour, a macadamia nut flavour, a peanut flavour, a pecan flavour, a pistachio flavour, and a walnut flavour; alcoholic flavours, such as a wine flavour, a whisky flavour, a brandy flavour, a rum flavour, a gin flavour, and a liqueur flavour; floral flavours; and vegetable flavours, such as an onion flavour, a garlic flavour, a cabbage flavour, a carrot flavour, a celery flavour, mushroom flavour, and a tomato flavour.

In some embodiments, said flavour co-ingredients include aldehydes and esters such as cinnamyl acetate, cinnamaldehyde, citral diethylacetal, dihydrocarvyl acetate, eugenyl 49 formate, p-methylamisol, and so forth can be used. Further examples of aldehyde flavourings include acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavours), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), and the like.

Further examples of other flavour co-ingredients can be found in "Chemicals Used in Food Processing", publication 1274, pages 63-258, by the National Academy of Sciences.

Flavour co-ingredients can also include salt tastants, umami tastants, and savoury flavour compounds. Non limiting examples include: NaCl, KCl, MSG, guanosine monophosphate (GMP), inosin monophospahte (IMP), ribonucleotides such as disodium inosinate, disodium guanylate, N-(2-hydroxyethyl)-lactamide, N-lactoyl-GMP, N-lactoyl tyramine, gamma amino butyric acid, allyl cysteine, 1-(2-hydroxy-4-methoxylphenyl)-3-(pyridine-2-yl)propan-1-one, arginine, potassium chloride, ammonium chloride, succinic acid, N-(2-methoxy-4-methyl benzyl)-N'-(2-(pyridin-2-yl)ethyl) oxalamide, N-(heptan-4-yl)benzo(D)(1,3)dioxole-5-carboxamide, N-(2,4-dimethoxybenzyl)-N'-(2-(pyridin-2-yl)ethyl) oxalamide, N-(2-methoxy-4-methyl benzyl)-N'-2(2-(5-methyl pyridin-2-yl)ethyl) oxalamide, cyclopropyl-E,Z-2,6-nonadienamide.

In particular embodiments of the present invention, the flavour co-ingredient is selected from the compounds and compositions disclosed in WO2005102701, WO2006009425, WO2005096843, WO2006046853 and WO2005096844, all of which references are herein incorporated by reference in their entirety.

The carrier material may be employed in compositions according to the invention to encapsulate or to entrap in a matrix the other components of the composition. The role of the carrier material may be merely that of a processing aid or a bulking agent, or it might be employed to shield or protect the other components from the effects of moisture or oxygen or any other aggressive media. The carrier material might also act as a means of controlling the release of flavour in food applications.

Carrier materials may include mono, di- or trisaccharides, natural or modified starches, hydrocolloids, cellulose derivatives, polyvinyl acetates, polyvinylalcohols, proteins or pectins. Example of particular carrier materials include sucrose, glucose, lactose, levulose, fructose, maltose, ribose, dextrose, isomalt, sorbitol, mannitol, xylitol, lactitol, maltitol, pentatol, arabinose, pentose, xylose, galactose, maltodextrin, dextrin, chemically modified starch, hydrogenated starch hydrolysate, succinylated or hydrolysed starch, agar, carrageenan, gum arabic, gum accacia, tragacanth, alginates, methyl cellulose, carboxymethyl cellulose, hydroxyethyl cellulose, hydroxypropylmethyl cellulose, derivatives and mixtures thereof. Of course, the skilled addresse with appreciate that the cited materials are hereby given by way of example and are not to be interpreted as limiting the invention.

By "flavour adjuvant" is meant an ingredient capable of imparting additional added benefit to compositions of the present invention such as a colour, light resistance, chemical stability and the like. Suitable adjuvants include solvents (including water, alcohol, ethanol, triacetine, oils, fats, vegetable oil and miglyol), binders, diluents, disintegrating agents, lubricants, colouring agents, preservatives, antioxidants, emulsifiers, stabilisers, anti-caking agents, and the like. In a particular embodiment, the flavour composition comprises an anti-oxidant. Said anti-oxidants may include vitamin C, vitamin E, rosemary extract, antrancine, butylated hydroxyanisole (BHA) and butylated hydroxytoluene (BHT).

Examples of such carriers or adjuvants for flavour compositions may be found in for example, "Perfume and Flavour Materials of Natural Origin", S. Arctander, Ed., Elizabeth, N.J., 1960; in "Perfume and Flavour Chemicals", S. Arctander, Ed., Vol. 1 & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Washington, 1988.

Other suitable and desirable ingredients of flavour compositions are described in standard texts, such as "Handbook of Industrial Chemical Additives", ed. M. and I. Ash, $2^{nd}$ Ed., (Synapse 2000).

Flavour compositions according to the present invention may be provided in any suitable physical form. For example, they may be in the form of oils, emulsions or dispersions in a hydrous liquid or organic liquid suitable for use in edible compositions, or solid form, such as powders.

If the flavour compositions are to be provided in the form of a powdered composition, they may be prepared by dispersive evaporation techniques generally known in the art, such as spray drying.

Accordingly, in another aspect of the present invention there is provided a method of forming a powder composition, comprising the steps of providing a liquid composition comprising a compound of the formula (I) and one or more optional ingredients selected from at least one flavour co-ingredient, a carrier material, an adjuvant and an ingredient that imparts an undesirable or off-taste; and dispersively evaporating said liquid composition to form a powder composition.

In this manner, a compound of formula (I) or a flavour composition comprising said compound, may be rendered into a powder form.

The liquid composition used in the preparation of a powder may be in the form of a solution, emulsion, dispersion or slurry. The liquid may contain water, and/or an organic liquid, such as ethanol, triacetine, miglyol (MCT) that is acceptable for use in edible compositions. It should have a viscosity that renders it suitable for use in dispersive evaporation apparatus such as a spray dryer.

Powder compositions according to the present invention may be prepared according to methods and apparatus known in the art for producing powders on an industrial scale. A particularly suitable method is spray drying. Spray drying techniques and apparatus are well known in the art and need no detailed discussion herein. The spray drying techniques, apparatus and methods described in US2005/0031769 and US2013/0022728, as well as those techniques, apparatus and methods described in those documents are suitable for producing powder compositions of the present invention and are herein incorporated by reference in their entirety.

The manner in which the compounds of formula (I) are incorporated into powder flavour compositions of the invention is not critical. For example, the compounds may be added to the liquid composition described above and be subjected to a dispersive evaporation process along with all the other components of the flavour composition. Alternatively, compounds may be added to the flavour composition after it has been formed as a powder.

The term "edible composition" refers to products for consumption by a subject, typically via the oral cavity (although consumption may occur via non-oral means such as inhalation), for at least one of the purposes of enjoyment, nourishment, or health and wellness benefits. Edible compositions may be present in any form including, but not limited to, liquids, solids, semi-solids, tablets, capsules, lozenges, strips, powders, gels, gums, pastes, slurries, syrups, aerosols and sprays. The term also refers to, for example, dietary and nutritional supplements. Edible compositions include compositions that are placed within the oral cavity for a period of time before being discarded but not swallowed. It may be placed in the mouth before being consumed, or it may be held in the mouth for a period of time before being discarded. An edible composition as herein above defined includes compositions whose taste is modified in the manner described herein by the addition of compounds of formula (I) or whose taste is so modified by processing such that it is enriched in a compound of formula (I).

Broadly, the edible composition includes, but is not limited to foodstuffs of all kinds, confectionery products, baked products, sweet products, savoury products, fermented products, dairy products, beverages and oral care products.

In a particular embodiment the term "edible compositions" refers to products for consumption by a subject, typically via the oral cavity (although consumption may occur via non-oral means such as inhalation), for one of the purposes of enjoyment or nourishment.

In a more particular embodiment the term "edible compositions" refers to products for consumption by a subject, typically via the oral cavity (although consumption may occur via non-oral means such as inhalation), for the purpose of enjoyment. Still more particularly, the term refers to foodstuffs and beverages.

Exemplary foodstuffs include, but are not limited to, chilled snacks, sweet and savoury snacks, fruit snacks, chips/crisps, extruded snacks, tortilla/corn chips, popcorn, pretzels, nuts, other sweet and savoury snacks, snack bars, granola bars, breakfast bars, energy bars, fruit bars, other snack bars, meal replacement products, slimming products, convalescence drinks, ready meals, canned ready meals, frozen ready meals, dried ready meals, chilled ready meals, dinner mixes, frozen pizza, chilled pizza, soup, canned soup, dehydrated soup, instant soup, chilled soup, uht soup, frozen soup, pasta, canned pasta, dried pasta, chilled/fresh pasta, noodles, plain noodles, instant noodles, cups/bowl instant noodles, pouch instant noodles, chilled noodles, snack noodles, dried food, dessert mixes, sauces, dressings and condiments, herbs and spices, spreads, jams and preserves, honey, chocolate spreads, nut-based spreads, and yeast-based spreads.

Exemplary confectionery products include, but are not limited to, chewing gum (which includes sugarized gum, sugar-free gum, functional gum and bubble gum), centerfill confections, chocolate and other chocolate confectionery, medicated confectionery, lozenges, tablets, pastilles, mints, standard mints, power mints, chewy candies, hard candies, boiled candies, breath and other oral care films or strips, candy canes, lollipops, gummies, jellies, fudge, caramel, hard and soft panned goods, toffee, taffy, liquorice, gelatin candies, gum drops, jelly beans, nougats, fondants, combinations of one or more of the above, and edible flavour compositions incorporating one or more of the above.

Exemplary baked products include, but are not limited to, alfajores, bread, packaged/industrial bread, unpackaged/artisanal bread, pastries, cakes, packaged/industrial cakes, unpackaged/artisanal cakes, cookies, chocolate coated biscuits, sandwich biscuits, filled biscuits, savoury biscuits and crackers, bread substitutes, Exemplary sweet products include, but are not limited to, breakfast cereals, ready-to-eat ("rte") cereals, family breakfast cereals, flakes, muesli, other ready to eat cereals, children's breakfast cereals, hot cereals, Exemplary savoury products include, but are not limited to, salty snacks (potato chips, crisps, nuts, tortilla-tostada, pretzels, cheese snacks, corn snacks, potato-snacks, ready-to-eat popcorn, microwaveable popcorn, pork rinds, nuts, crackers, cracker snacks, breakfast cereals, meats, aspic, cured meats (ham, bacon), luncheon/breakfast meats (hotdogs, cold cuts, sausage), tomato products, margarine, peanut butter, soup (clear, canned, cream, instant, UHT), canned vegetables, pasta sauces.

Exemplary dairy products include, but are not limited to, cheese, cheese sauces, cheese-based products, ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, dairy products, milk, fresh/pasteurized milk, full fat fresh/pasteurized milk, semi skimmed fresh/pasteurized milk, long-life/uht milk, full fat long life/uht milk, semi skimmed long life/uht milk, fat-free long life/uht milk, goat milk, condensed/evaporated milk, plain condensed/evaporated milk, flavoured, functional and other condensed milk, flavoured milk drinks, dairy only flavoured milk drinks, flavoured milk drinks with fruit juice, soy milk, sour milk drinks, fermented dairy drinks, coffee whiteners, powder milk, flavoured powder milk drinks, cream, yoghurt, plain/natural yoghurt, flavoured yoghurt, fruited yoghurt, probiotic yoghurt, drinking yoghurt, regular drinking yoghurt, probiotic drinking yoghurt, chilled and shelf-stable desserts, dairy-based desserts, soy-based desserts.

Exemplary beverages include, but are not limited to, flavoured water, soft drinks, fruit drinks, coffee-based drinks, tea-based drinks, juice-based drinks (includes fruit and vegetable), milk-based drinks, gel drinks, carbonated or non-carbonated drinks, powdered drinks, alcoholic or non-alcoholic drinks.

Exemplary fermented foods include, but are not limited to, Cheese and cheese products, meat and meat products, soy and soy products, fish and fish products, grain and grain products, fruit and fruit products.

In a particular embodiment the consumable product is selected from the group consisting of soy sauce, cheese, soup, hot and cold sauces, fruits, vegetables, ketchups, tea, coffee, snacks such as potato chips or extruded snacks.

In addition to the taste masking properties, the compounds of formula (I), when added to a flavour composition and/or an edible composition, act on a composition to complement its flavour and/or mouthfeel to render it more delicious and authentic. The effects may be temporal or related to intensity, for example the compounds may act by enhancing, strengthening, softening, sharpening a flavour, or making more salivating. The compounds of formula (I) may also affect the temporal profile of a flavour, that is, they may affect the initial impact of a flavour, the body of a flavour, or its lingering effect.

The compounds of formula (I) may modify any aspect of the temporal profile of taste or flavour of an edible composition. In particular, the compounds improve mouthfeel and impart more creamy and fatty sensations.

Compounds of formula (I) or flavour compositions containing same may be added to edible compositions in widely carrying amounts. The amount will depend on the nature of the edible composition to be flavoured, and on the desired effect, as well as on the nature of the ingredients present in said flavour composition. In order to obtain the remarkable beneficial effects attributed to the presence of the compounds of formula (I), the flavour composition should be employed in amounts such that the compounds of formula (I) are present in amounts of Typical non-limiting concentrations of compounds of formula (I) employed in edible compositions are 1 ppb to 10 ppm, more particularly 1 ppb to 8 ppm, more particularly, 10 ppb-5 ppm based on the total weight of the edible composition.

In a particular embodiment of the invention compounds of formula (I) may be incorporated into edible compositions that are formed under conditions of high temperature, such as baking, frying or which are processed by heat treatments such as pasteurization or under UHT conditions. Under high preparation or processing temperatures, volatile flavour ingredients may be lost or degraded with the result that flavour intensity can be reduced and the essential and authentic flavour characteristics can be diminished. Such edible products include dairy products, snack foods, baked products, powdered soft drinks and similar dry mixes, and the like, fats and condiments, mayonnaise, dressings, soups and bouillons, and beverages.

In a particular embodiment of the invention compounds of formula (I) may be incorporated into powdered soft drinks and similar dry mix applications. Dry mix applications are known in the art and included products in powder form that are intended to be reconstituted before consumption. They include powdered soups, powdered cake mixes, powdered chocolate drinks, instant coffees, seasonings and fonds, and the like.

Dry powders formed by dispersive evaporation processes, such as spray drying, represent a very convenient vehicle to deliver flavour oil quality flavours to edible compositions.

Unfortunately, flavour oils, and in particular citrus flavour oils can be particularly sensitive to dispersive evaporation processes, especially processes carried out at high temperature. Flavour oils tend to evaporate or degrade to form products having unfavourable off-notes. Powdered flavour compositions, particularly those containing citrus oils, can be of poor quality and exhibit relatively short self-life, as a result.

Incorporation of compounds of formula (I) into such powder compositions can maintain or restore the impact and authenticity of the flavour oils used in their preparation, essentially maintaining flavour oil quality in a powdered flavour formulations.

In another aspect of the invention there is provided a powder soft drink composition or other dry mix composition comprising a compound according to formula (I).

In yet another aspect of the present invention there is provided a powder soft drink composition or other dry mix composition comprising a powder flavour composition comprising a compound of formula (I).

In yet another aspect of the present invention there is provided a method of forming a powder flavour composition comprising the step of incorporating into said composition a compound according to formula (I).

In a particular embodiment of the invention compounds of formula (I) may be incorporated into snack foods. Snack foods are a category of product well known to the skilled person in the food industry. These products are described above and include, without limitation, pretzels, corn chips, potato chips, puffed products, extruded products, tortilla chips and the like. Still more particularly, the invention is concerned with low fat snack food compositions. Low fat snack food compositions contain less that 30% by weight fat, more particularly between 5 to 25% by weight of fat.

A problem with reducing fat in a snack food composition is the loss in taste and texture. Fats play an important role in the way that dough behaves during processing and greatly affect the quality, flavor and texture of ready-to-eat products. As the fat content in snack products is reduced or replaced with other ingredients (e.g., non-digestible fat, protein, fiber, gums), adverse organoleptic effects (e.g., mouth coating, drying, lack of crispness and lack of flavour) are increased. The adverse organoleptic effects result in products having reduced palatability.

Considerable efforts have been expended in devising flavour compositions to overcome the problems associated with low fat snack food products. Flavours may be applied to a snack food as topical coatings in the form of dry powders and/or as liquids (e.g., oil-based, water-based). Another approach has been to add flavour to the dough.

Despite these various approaches which have been taken to improve consumer appeal and palatability of snack foods, and particularly low fat snack foods, there is still a need for improved low-fat snack foods having coatings applied thereto with the visual appeal, flavor, and texture of full-fat snack foods.

Compounds according to formula (I) or flavour compositions containing same can be incorporated into snack foods to impart an impactful flavour and a mouthfeel with a remarkable roundness and fullness, and masking of any off-notes. Furthermore, the taste and mouthfeel effects can be achieved even in low fat snack foods.

Accordingly, the invention provides in another of its aspects a snack food comprising a flavour composition as hereinabove described. In a particular embodiment of the invention the snack food has a fat content of about 40% or less by weight based on the total weight of the snack food, more particularly about 30% or less, still more particularly 25% or less, more particularly still about 10% or less, still more particularly about 5% or less, still more particularly about 3% or less.

Examples of snack foods are described above and include products processed by oven baking, extrusion or frying, and which are made from potato and/or corn and/or various grains such as rice or wheat.

In a particular embodiment of the invention compounds of formula (I) may be incorporated into alcoholic beverages.

Applicant surprisingly found that compounds according to formula (I) incorporated into an alcoholic beverage had the effect of increasing the alcohol impact of the beverage.

Accordingly, the invention provides in another of its aspects an alcoholic beverage comprising a compound according to formula (I).

In yet another aspect of the invention there is provided a method of producing a heightened alcoholic impression in an alcoholic beverage by incorporating into said beverage a compound according to formula (I).

Compounds of formula (I) may be incorporated into said alcoholic beverage in amounts of 1 ppb to 1 ppm.

Another class of edible compositions are products taken orally in the form of tablets, capsules, powders, multiparticulates and the like. Such compounds may include pharmaceutical dosage forms or nutraceutical dosage forms.

Certain groups of people have problems swallowing tablets or capsules, powders, multi-particulates and the like. This problem can be particularly pronounced in certain consumer groups, such as children and the very old or infirm. Applicant surprisingly found that compounds according to the formula (I) when taken into the oral cavity produce a pronounced salivating effect. Incorporating the compounds into these forms, particularly as part of a coating around said dosage forms can ease the swallowing process for consumers, in particular children and the old or infirm.

Accordingly, the invention provides in another of its aspects an orally administrable dosage form, in particular in the form of tablets capsules, powders or multiparticulates comprising a compound according to the formula (I).

In a particular embodiment of the invention compounds of formula (I) may be incorporated into baked goods. Compounds of the formula (I) may be incorporated topically or in-dough. Incorporated at levels of 1 ppb to 1 ppm, the compounds of formula (I) render baked products less dry and more succulent.

Other preferred class of edible compositions are caloric or non-caloric beverages containing carbohydrate sweeteners, such as sucrose, high fructose corn syrup, fructose and glucose, or high intensity, non-nutritive sweeteners such as aspartame, acesulfame K, sucralose, cyclamate, sodium saccharin, neotame, rebaudioside A, and/or other stevia-based sweeteners; as well as other optional ingredients such as juices, organic acids such as citric acid, alcohol and functional ingredients.

Incorporated at levels of 1 ppb to 10 ppm, compounds of formula (I) impart to said beverages containing sweeteners at levels of less than 1% and up to about 20%, an upfront sweetness and mouthfeel that is reminiscent of sugar.

Other preferred edible compositions are savoury compositions, in particular those that are soy-based or fish-based.

Incorporated at levels of 1 ppb to 10 ppm, in a soy-based composition (such as soy sauce) or a fish-based composition (such as fish sauce) containing 5 to 40% salt, the compositions are found to exhibit strong umami tastes that are long-lasting and rich.

In a particular embodiment of the invention compounds of formula (I) may be incorporated into clouded beverage composition.

Certain beverages such as juices have relatively higher turbidity and thus have an opaque appearance. Often, it is desired that the beverage have a relatively high turbidity. This might be desirable to provide a more natural appearance to beverages with low juice content, or it might be for reasons related to masking sedimentation or "ringing" (where flavour or colour oils rise to the surface of a container during storage). Clouded beverages are usually formed by means of a clouding agent. Clouding agents are usually supplied in the form of emulsions, or the clouding agent may be part of a powdered beverage that upon reconstitution will formed an emulsion providing a permanent cloud to the beverage.

Compounds of the formula (I), in addition to their remarkable organoleptic properties, can lend stability to clouding agents and to beverage compositions containing same.

Accordingly, the invention provides in another of its aspects a composition comprising a beverage clouding composition and a compound of formula (I).

In a particular embodiment of the invention, a flavour composition as herein defined may be provided in the form of an emulsion. This emulsion composition may be particularly useful in clouded beverage applications, in particular, in which it is intended to employ a clouding agent.

In yet another aspect of the invention there is provided a clouded beverage composition comprising a clouding agent and a compound of the formula (I).

Other preferred edible compositions are those compositions that are formed by a process of ripening.

In food processing, it frequently occurs that a food needs to remain for a prolonged period of time and under well-defined conditions to obtain the food with the requisite and recognised quality. A commonly used term for this process is ripening. Ripening is well known in the processing of certain types of cheese, meat, soy-sauce and wine, as well as beer sausage, sauerkraut, tempeh and tofu. There are also specific steps that are carried out for specific reasons (such as water-removal, or off-note removal) that have beneficial effects on the food products. Examples of this are the conching of chocolate and the drying of noodles, vegetables and fruits. The transformations that improve the quality of the food are induced by chemical conversions, enzymatically catalysed conversions or fermentative transformations. All of these conversions are slow and therefore expensive; they are also not fully predictable or controllable.

The compounds of formula (I), having regard to their remarkable property of adding to the authentic taste characteristics of the edible compositions in which they are incorporated, may be added to an edible product during its ripening process in order to reduce storage time without adversely influencing the taste quality of the ripened product.

Accordingly, in another aspect of the invention there is provided a method of ripening a product selected from the group consisting of cheese, meat, soy-sauce and wine, beer, sausage, sauerkraut, tempeh and tofu, comprising the step of ripening the product in the presence of a compound according to the formula (I).

In another aspect of the invention there is provided a method of conching chocolate, said method comprising the step of adding to the chocolate a compound according to the formula (I), or a flavour composition containing same.

There now follows a series of non-limiting examples that serve to illustrate the invention.

SYNTHESIS EXAMPLES

1.1 Route A: (DCC Method)

In a 250 mL round-bottomed flask was mixed fatty acid (3.93 mmol) with 1-hydroxypyrrolidine-2,5-dione (0.498 g, 4.32 mmol) in dioxane (50 ml) to give a colorless solution. The solution was cooled to 10° C. and DCC (0.892 g, 4.32 mmol) was added while stirring. Stirring was continued for three hours at room temperature. The formed solids were filtered (dicyclohexylurea) and the filtrate was added to a solution of amino acid (6.48 mmol) in a 2% solution of sodiumbicarbonate (0.363 g, 4.32 mmol) in water. The reaction mixture was stirred for 4 hours at 50° C. Dioxane was evaporated and the aqueous residue was further diluted with water, acidified with a diluted hydrochloric acid solution and extracted with ethylacetate. Organic layers were combined, washed with brine, dried and evaporated to yield 1.3 g of a white solid. Product was purified by flash column chromatography, eluent DCM/methanol.

1 g of 85-90% pure product could be obtained.

1.2 Route B (DCC Method with Protection Group)

Step 1:

To a solution of an O-methylated amino acid (16.51 mmol) in DCM (100 ml) was added triethylamine (1.519 g, 15.01 mmol) at minus 15° C. A fatty acid (0.01 mmol) was added while stirring. A solution of DCC (15.01 mmol) in 10 mL of DCM was added dropwise at 0° C. The reaction mixture was stirred at 0° C. for 1 hour and stirring was continued at room temperature for 3 hours. The dicyclohexylurea was removed by filtration from the reaction mixture. Filtrate was washed with a saturated sodiumbicarbonate solution, diluted hydrochloric acid solution and water. Organic layer was separated, dried and evaporated to yield 3 g of an oil. This oil was purified by flash column chromatography, eluent DCM/methanol The intermediate ester compound could be isolated in a purity of 95%.

Step 2:

The O-methylated N-acyl-amino-acid (4.91 mmol) was dissolved in a mixture of Ethanol (8.00 ml) and water (8 ml). To this mixture was added a 32% solution of sodiumhydroxide (2.453 g, 19.63 mmol) and mixture was stirred at room temperature for three hours. Mixture stand over for 14 hours.

After 14 hours the mixture was acidified with a concentrated hydrochloric acid solution (1.612 ml, 19.63 mmol), diluted with water and extracted with mtbe. Organic layer was separated, dried and evaporated. 1.3 g of a half solid yellow residue was obtained. NMR confirmed the structure of the title compound, purity 95%

1.3 Route C (Acid Chloride)

An amino acid (20 mmol) was dissolved in a solution of sodiumhydroxide (54.5 mmol) in water (40 ml).

Tetrahydrofuran (60 ml) was added. Fatty acid chloride (18.18 mmol) was added dropwise at room temperature. Stirring was continued for 2 hours. Mixture was diluted with water, acidified with a 37% solution of hydrochloric acid (2.99 ml, 36.4 mmol) and extracted with ethylacetate.

Organic layers were combined, dried and evaporated.

The residue contains about 20% free fatty acid according NMR. The solids were stirred with heptane for 30 minutes, filtered and dried. This resulted in 2.4 g of the title compound as a creamy colored solid. (purity 95%).

1.4 all Synthesized Compounds

TABLE 1

List of synthesized compounds

| Structure | Amino acid | Carboxylic acid | Structure | Route |
|---|---|---|---|---|
| 1 | ACC | C10:0 | | C |
| 2 | ACC | C10:2 | | A |
| 3 | ACC | C16:0 | | C |
| 4 | ACC | C18:0 | | C |

TABLE 1-continued

List of synthesized compounds

| Structure | Amino acid | Carboxylic acid | Structure | Route |
|---|---|---|---|---|
| 5 | ACC | C18:1 | | C |
| 6 | ACC | C18:2 | | A |
| 7 | GABA | C10:0 | | C |
| 8 | GABA | C12:0 | | C |
| 9 | GABA | C12:1 | | C |
| 10 | GABA | C10:2 | | C |
| 11 | GABA | C14:0 | | C |
| 12 | GABA | C16:0 | | C |

TABLE 1-continued
List of synthesized compounds
| Structure | Amino acid | Carboxylic acid | Structure | Route |
|---|---|---|---|---|
| 13 | GABA | C16:1 | 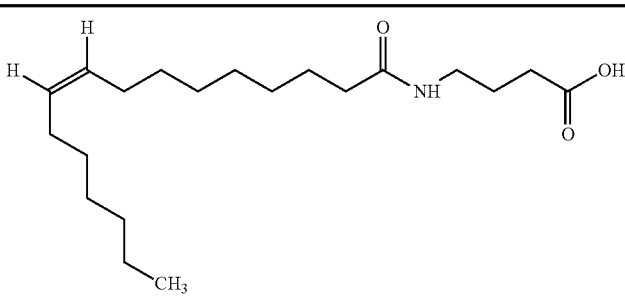 | A |
| 14 | GABA | C18:0 | 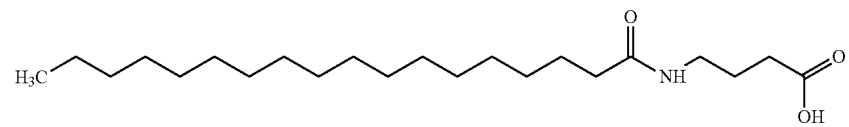 [SMILES: CCCCCCCCCCCCCCCCCC(=O)NCCCC(=O)O] | C |
| 15 | GABA | C18:1$_c$ | 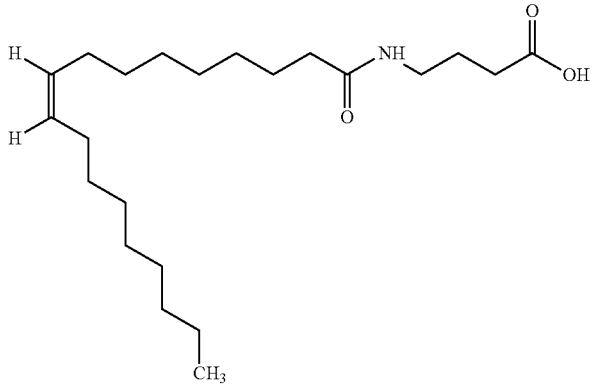 [SMILES: CCCCCCCC/C=C\CCCCCCCC(=O)NCCCC(=O)O] | C |
| 16 | GABA | C18:1$_t$ | 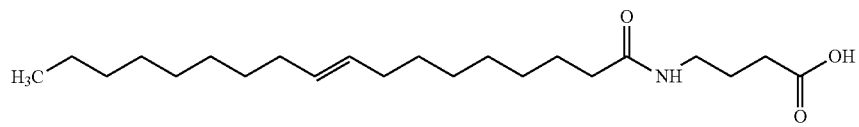 [SMILES: CCCCCCCC/C=C/CCCCCCCC(=O)NCCCC(=O)O] | C |
| 17 | GABA | C18:2 | 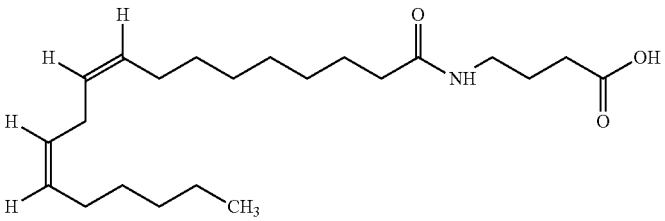 [SMILES: CCCCC/C=C\C/C=C\CCCCCCCC(=O)NCCCC(=O)O] | A |
| 18 | GABA | C18:3 | 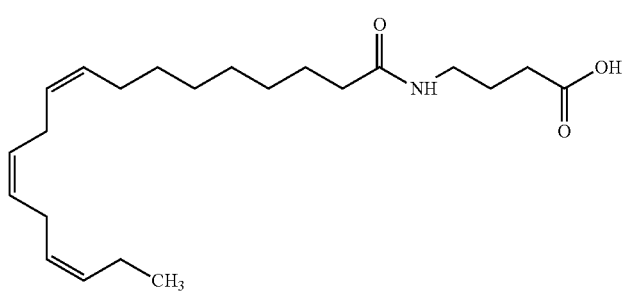 [SMILES: CC/C=C\C/C=C\C/C=C\CCCCCCCC(=O)NCCCC(=O)O] | A |

TABLE 1-continued
List of synthesized compounds
| Structure | Amino acid | Carboxylic acid | Structure | Route |
|---|---|---|---|---|
| 19 | GABA | C22:1 | 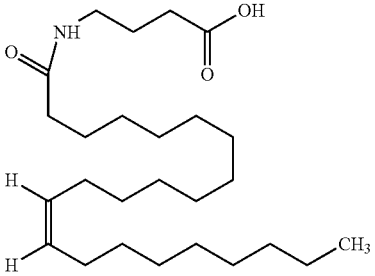 [SMILES: CCCCCCCC/C=C\CCCCCCCCCCCC(=O)NCCCC(=O)O] | C |
| 20 | Beta-alanine | C16:1 | 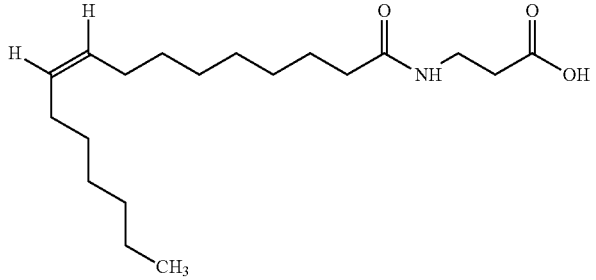 [SMILES: CCCCCC/C=C\CCCCCCCC(=O)NCCC(=O)O] | A |
| 21 | Beta-alanine | C18:1 | 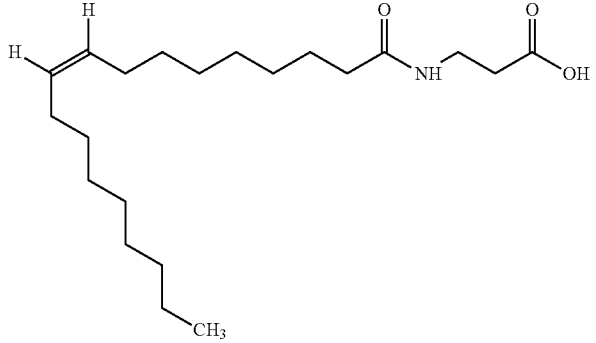 [SMILES: CCCCCCCC/C=C\CCCCCCCC(=O)NCCC(=O)O] | C |
| 22 | Beta-alanine | C18:2 | 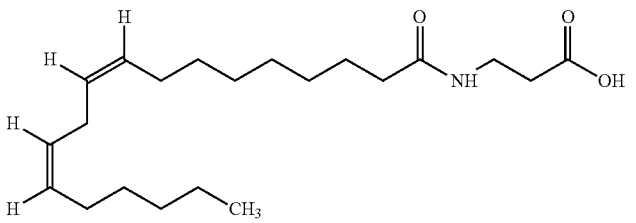 [SMILES: CCCCC/C=C\C/C=C\CCCCCCCC(=O)NCCC(=O)O] | A |
| 23 | Aspartic acid | C10:0 | 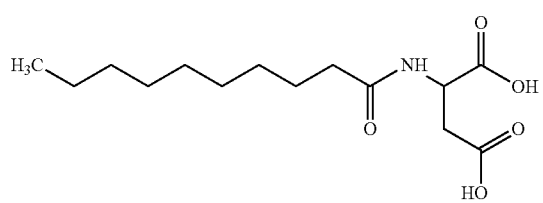 [SMILES: CCCCCCCCCC(=O)NC(CC(=O)O)C(=O)O] | C |

TABLE 1-continued

List of synthesized compounds

| Structure | Amino acid | Carboxylic acid | Structure | Route |
|---|---|---|---|---|
| 24 | Aspartic acid | C10:2 | | B |
| 25 | Aspartic acid | C16:0 | | C |
| 26 | Aspartic acid | C18:0 | | C |
| 27 | Aspartic acid | C18:1 | | C |
| 28 | Aspartic acid | C18:2 | | A |
| 29 | Glutamic acid | C10:0 | | C |

TABLE 1-continued
List of synthesized compounds
| Structure | Amino acid | Carboxylic acid | Structure | Route |
|---|---|---|---|---|
| 830 | Glutamic acid | C16:0 | 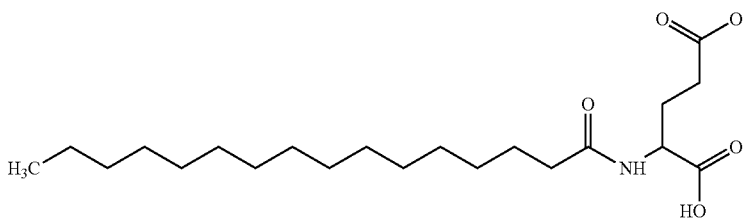 | C |
| 31 | Glutamic acid | C16:1 | 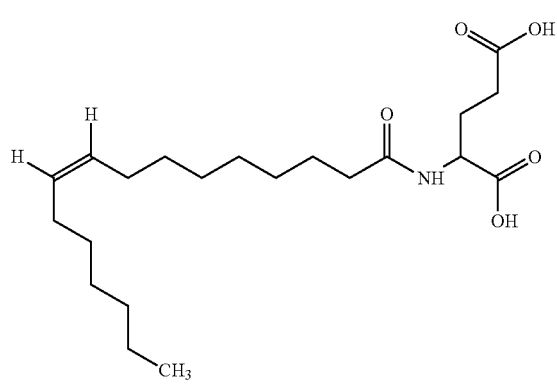 [SMILES: CCCCCC/C=C\CCCCCCCC(=O)NC(CCC(=O)O)C(=O)O] | A |
| 32 | Glutamic acid | C18:0 | 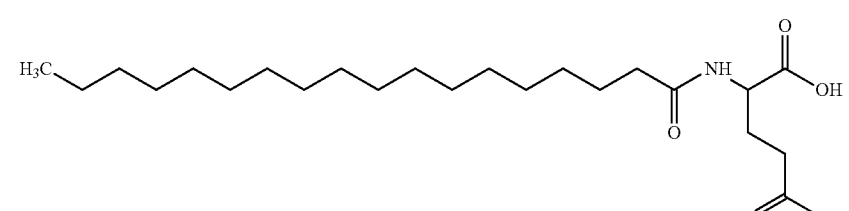 | C |
| 33 | Glutamic acid | C18:1 | 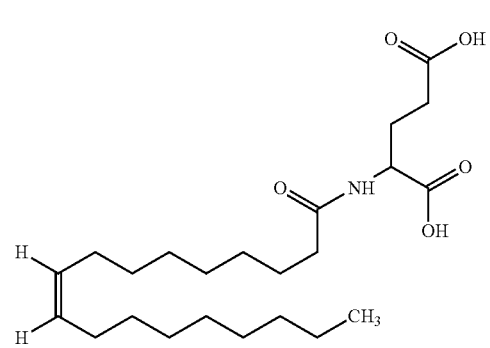 [SMILES: CCCCCCCC/C=C\CCCCCCCC(=O)NC(CCC(=O)O)C(=O)O] | C |
| 34 | Glutamic acid | C18:2 | 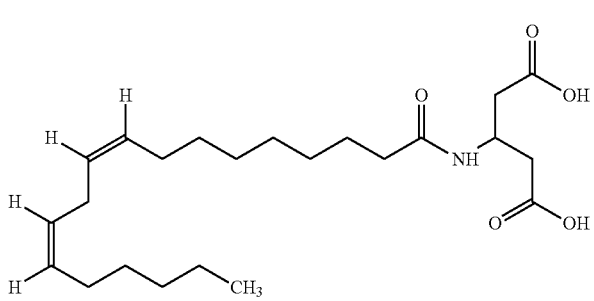 [SMILES: CCCCC/C=C\C/C=C\CCCCCCCC(=O)NC(CC(=O)O)CC(=O)O] | A |

TABLE 1-continued

List of synthesized compounds

| Structure | Amino acid | Carboxylic acid | Structure | Route |
|---|---|---|---|---|
| 35 | Glutamine | C10:0 | | C |
| 36 | Glutamine | C12:0 | | C |
| 37 | Glutamine | C10:2 | | A |
| 38 | Gutamine | C16:0 | | C |
| 39 | Glutamine | C18:0 | | C |
| 40 | Glutamine | C18:1 | | C |

TABLE 1-continued
List of synthesized compounds
| Structure | Amino acid | Carboxylic acid | Structure | Route |
|---|---|---|---|---|
| 41 | Glutamine | C18:2 | 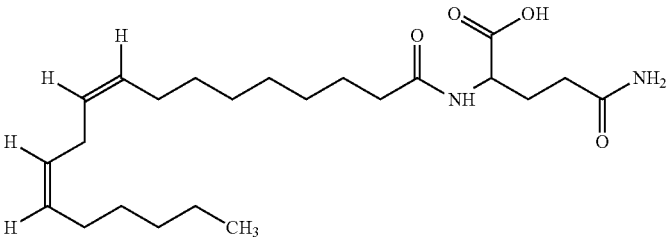 [SMILES: CCCCC/C=C\C/C=C\CCCCCCCC(=O)NC(CCC(N)=O)C(=O)O] | A |
| 42 | Methionine | C10:0 | 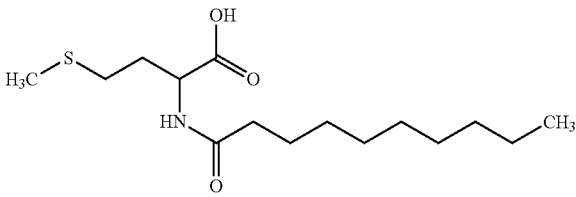 [SMILES: CCCCCCCCCC(=O)NC(CCSC)C(=O)O] | A |
| 43 | Methionine | C12:0 | 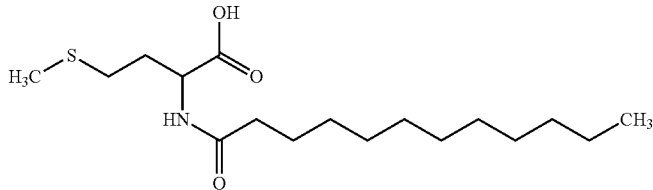 [SMILES: CCCCCCCCCCCC(=O)NC(CCSC)C(=O)O] | A |
| 44 | Methionine | C12:1 | 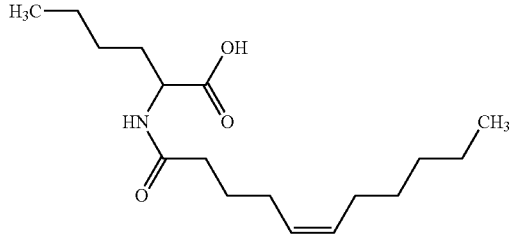 [SMILES: CCCCC/C=C\CCCC(=O)NC(CCCC)C(=O)O] | A |
| 45 | Methionine | C16:0 | 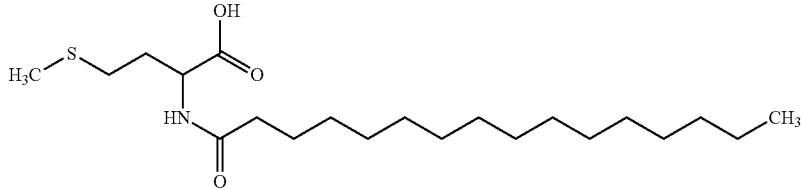 [SMILES: CCCCCCCCCCCCCCCC(=O)NC(CCSC)C(=O)O] | A |
| 46 | Methionine | C18:1 | 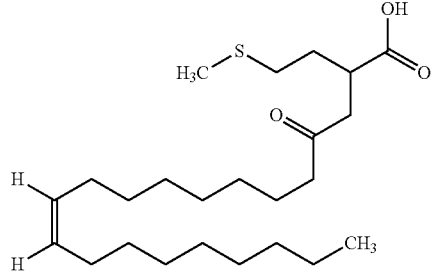 [SMILES: CCCCCCCC/C=C\CCCCCCCC(=O)CC(CCSC)C(=O)O] | A |

TABLE 1-continued

List of synthesized compounds

| Structure | Amino acid | Carboxylic acid | Structure | Route |
|---|---|---|---|---|
| 47 | Methionine | C18:2 | | A |
| 48 | Proline | C10:2 | | A |
| 49 | Proline | C16:0 | | C |
| 50 | Proline | C16:0 | | C |
| 51 | Proline | C18:2 | | A |
| 52 | Serine | C10:2 | | B |

TABLE 1-continued

List of synthesized compounds

| Structure | Amino acid | Carboxylic acid | Structure | Route |
|---|---|---|---|---|
| 53 | Serine | C16:0 | | C |
| 54 | Serine | C18:1 | | C |
| 55 | Serine | C18:2 | | A |
| 56 | Leucine | C-8:0 | | C |
| 57 | Leucine | C10:2 | | B |

TABLE 1-continued
List of synthesized compounds
| Structure | Amino acid | Carboxylic acid | Structure | Route |
|---|---|---|---|---|
| 58 | Leucine | C16:0 | 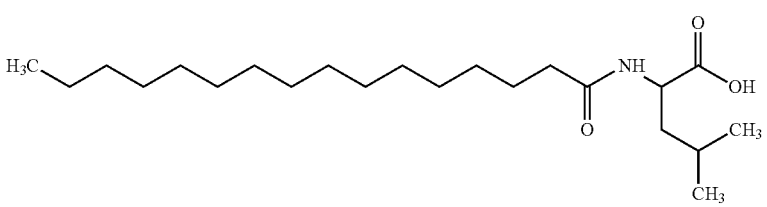 [SMILES: CCCCCCCCCCCCCCCC(=O)NC(CC(C)C)C(=O)O] | C |
| 59 | Leucine | C16:1 | 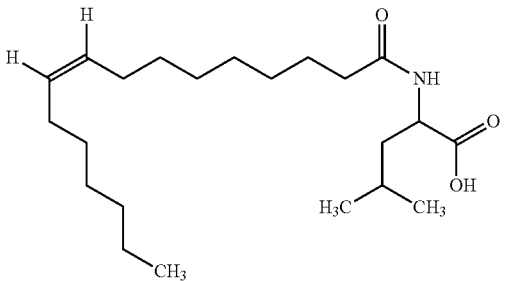 [SMILES: CCCCCC/C=C\CCCCCCCC(=O)NC(CC(C)C)C(=O)O] | A |
| 60 | Leucine | C18:0 | 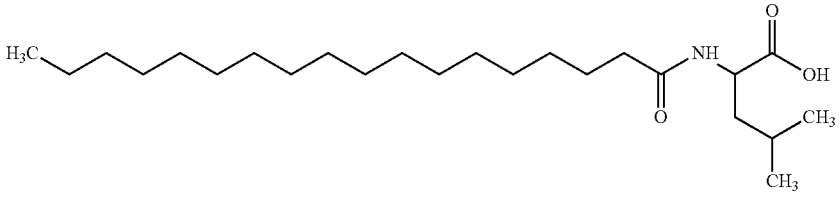 [SMILES: CCCCCCCCCCCCCCCCCC(=O)NC(CC(C)C)C(=O)O] | C |
| 61 | Leucine | C18:1 | 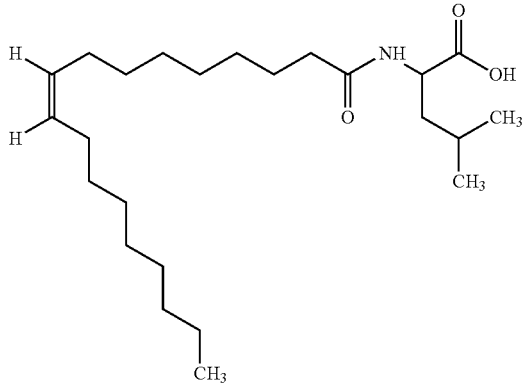 [SMILES: CCCCCCCC/C=C\CCCCCCCC(=O)NC(CC(C)C)C(=O)O] | C |
| 62 | Leucine | C18:2 | 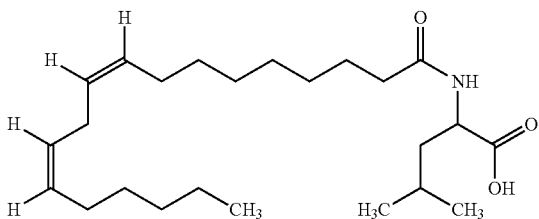 [SMILES: CCCCC/C=C\C/C=C\CCCCCCCC(=O)NC(CC(C)C)C(=O)O] | B |

TABLE 1-continued
List of synthesized compounds
| Structure | Amino acid | Carboxylic acid | Structure | Route |
|---|---|---|---|---|
| 63 | Leucine | C22:1 | 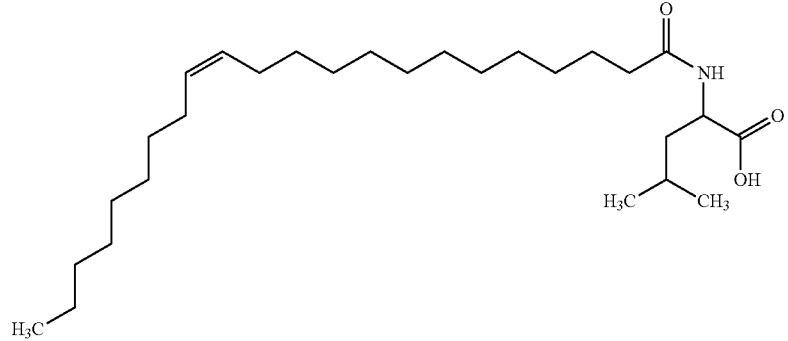 [SMILES: CCCCCCCC/C=C\CCCCCCCCCCCC(=O)NC(CC(C)C)C(=O)O] | A |
| 64 | Isoleucine | C18:1 | 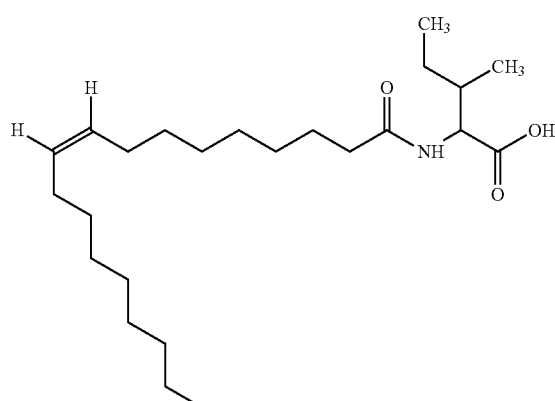 | C |
| 65 | Valine | C16:0 | 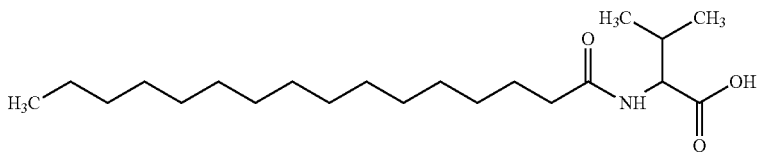 [SMILES: CCCCCCCCCCCCCCCC(=O)NC(C(=O)O)C(C)C] | C |
| 66 | Valine | C18:0 | 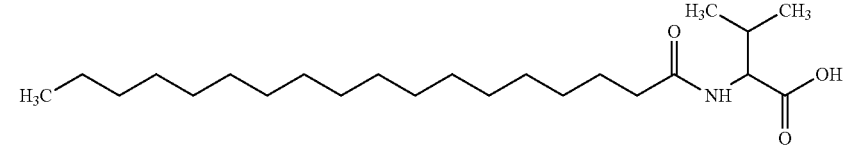 [SMILES: CCCCCCCCCCCCCCCCCC(=O)NC(C(=O)O)C(C)C] | C |
| 67 | Valine | C18:1 | 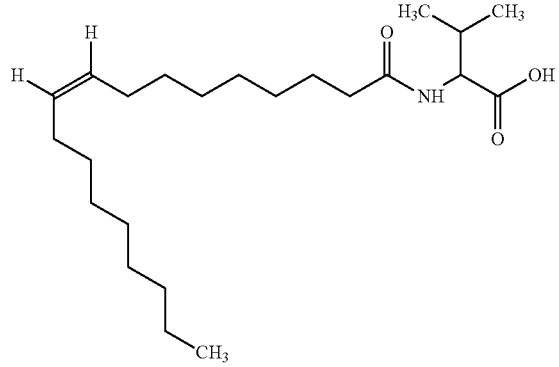 [SMILES: CCCCCCCC/C=C\CCCCCCCC(=O)NC(C(=O)O)C(C)C] | C |

TABLE 1-continued

List of synthesized compounds

| Structure | Amino acid | Carboxylic acid | Structure | Route |
|---|---|---|---|---|
| 68 | Valine | C18:2 | | A |

2 NMR Data (Examples)

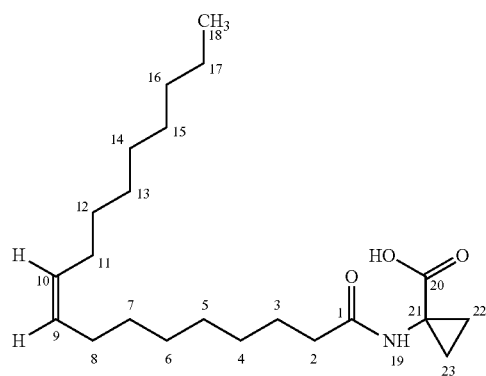 [SMILES: CCCCCCCC/C=C\CCCCCCCC(=O)NC1(C(=O)O)CC1]

2.1 Structure 5 ACC-C18:1

$^1$H NMR (600 MHz, CHLOROFORM-d) ▯ ppm 0.88 (0=7.05 Hz, 3H, H—C(18)) 1.09-1.21 (m, 2H H—C(22,23)) 1.21-1.1.39 (m, 20H, H—C(4, 5, 6, 7, 12, 13, 14, 15, 16, 17)) 1.54-1.68 (m, 4H, H—C(3, 22, 23)) 1.91-2.07 (m, 4H, H—C(8, 11)) 2.18 (0=7.73 Hz, 2H, H—C(2)) 5.26-5.44 (m, 2H, H—C(9, 10)) 6.28 (s, 1H, H—N(19))

$^{13}$C NMR (150 MHz, CHLOROFORM-d) ▯ ppm 14.13 (C(18) 18.01 (C(22, 23)) 22.69 (C(17)), 25.45 (C(3)), 27.19 (C(11 27.23 (C11)) 29.16 (C4)) 29.18 (C(6)) 29.26 (C(5)) 29.33 (C(13, 15)) 29.45 (C(14)) 29.72 (C(7)) 29.78 (C(12)) 31.91 (C(16, 21)) 33.47 (C(2)) 129.76 (C(10)) 129.99 (C(9)) 175.15 (C(1)) 177.39 (C(20))

2.2 Structure 7 GABA-C10:0

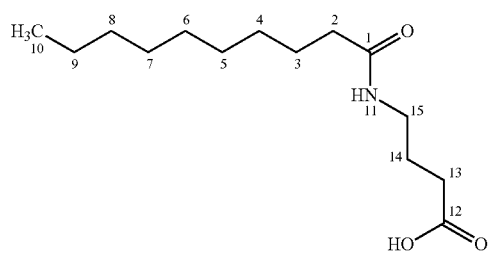

$^1$H NMR (600 MHz, DMSO-d$_6$) ▯ ppm 0.83-0.87 (m, 3H, H—C(10)) 1.18-1.29 (m, 12H, H—C(4, 5, 6, 7, 8, 9) 1.46 (quin, J=7.22 Hz, 2H, H—C(14)) 1.59 (quin, J=7.22 Hz, 2H, H—C(3)) 2.02 (t, J=7.39 Hz, 2H, H—C(2)) 2.19 (t, J=7.39 Hz, 2H, H—C(13)) 3.00-3.05 (m, 2H, H—C(15)) 7.77 (t, J=5.50 Hz, 1H, H—N(15)

$^{13}$C NMR (150 MHz, DMSO-d$_6$) ▯ ppm 13.95 (C(10)) 22.09 (C(9)) 24.64 (C(14)) 25.29 (C(3)) 28.64 (C(5)) 28.66 (C(7)) 28.78 (C(6)) 28.90 (C(4)) 31.07 (C(13)) 31.27 (C(8)) 35.38 (C(2)) 35.77 (C(15)) 172.03 (C(1)) 174.21 (C(12))

2.3 Structure 8 GABA-C12:0

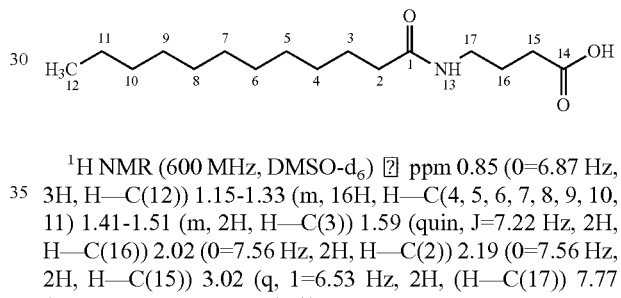

$^1$H NMR (600 MHz, DMSO-d$_6$) ▯ ppm 0.85 (0=6.87 Hz, 3H, H—C(12)) 1.15-1.33 (m, 16H, H—C(4, 5, 6, 7, 8, 9, 10, 11) 1.41-1.51 (m, 2H, H—C(3)) 1.59 (quin, J=7.22 Hz, 2H, H—C(16)) 2.02 (0=7.56 Hz, 2H, H—C(2)) 2.19 (0=7.56 Hz, 2H, H—C(15)) 3.02 (q, 1=6.53 Hz, 2H, (H—C(17)) 7.77 (0=5.33 Hz, 1H, H—N(13))

$^{13}$C NMR (150 MHz, DMSO-d$_6$) ▯ ppm 13.95 (C(12)) 22.09 (C(11)) 24.64 (C(16((25.29 (C(3)) 28.64 (C(9)) 28.71 (C(15)) 28.77 (C(6)) 28.95 (C(8)) 29.00 (C(5)) 29.02 (C(4)) 31.06 (C(7)) 31.29 (C(10)) 35.77 (C(17)) 172.02 (C(1)) 174.20 (C14))

2.4 Structure 17 GABA-C18:2

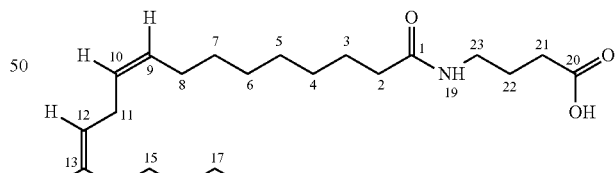

$^1$H NMR (600 MHz, CHLOROFORM-d) ▯ ppm 0.89 (t, J=6.87 Hz, 3H, H—C(18)) 1.26-1.39 (m, 14H, H—C(4, 5, 6, 7, 15, 16, 17) 1.57-1.65 (m, 2H, H—C(3)) 1.84 (quin, J=6.96 Hz, 2H, H—C(22)) 2.05 (q, J=7.22 Hz, 4H, H—C(8), H—C(14)) 2.19 (0=7.73 Hz, 2H, H—C(2)) 2.40 (0=7.05 Hz, 2H, H—C(21)) 2.77 (0=6.87 Hz, 2H, H—C(11)) 3.33 (q, J=6.53 Hz, 2H, H—C(23)) 5.30-5.41 (m, 4H, H—C(9, 10, 12,13) 5.96 (br. s., 1H, H—N(19))

$^{13}$C NMR (150 MHz, CHLOROFORM-d) ▯ ppm 14.08 (C(18) 22.58 C(17)) 24.74 (C3)) 25.63 (C(22)) 25.75

(C(11)) 27.20 (C8, 14)) 29.15 (C(6)) 29.26 (C(5, 21)) 29.35 (C(15)) 29.62 (C(4)) 31.49 C(7)) 31.52 C(16)) 36.73 C(2)) 38.84 (C23)) 127.90 (C12)) 128.06 (C(10)) 130.03 (C(9) 130.25 (C(13)), 174.17 (C(1) 177.43 (C(20))

2.5 Structure 22 Beta-Alanine-C18:2

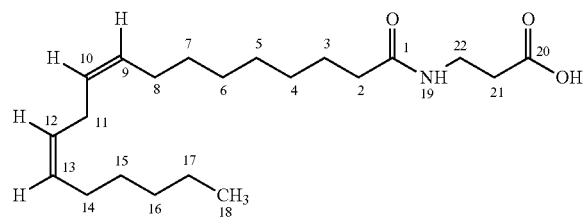 [SMILES: CCCCC/C=C\C/C=C\CCCCCCCC(=O)NCCC(=O)O]

$^1$H NMR (600 MHz, DMSO-d$_6$) ? ppm 0.85 (t, J=7.05 Hz, 3H, H—C(18)) 1.11-1.37 (m, 14H, H—C(4, 5, 6, 7, 15, 16, 17) 1.37-1.53 (m, 2H, H—C(3)) 1.94-2.08 (m, 6H, H—C(2, 8, 14) 2.34 (t, J=6.87 Hz, 2H, H—C(21)) 2.73 (t, J=6.70 Hz, 2H, H—C(11)) 3.13-3.27 (m, 2H, H—C(22)) 5.24-5.40 (m, 4H, H—C(12, 13)) 7.84 (t, J=5.67 Hz, 1H, H—N(19))

$^{13}$C NMR (150 MHz, DMSO-d$_6$) ? ppm 13.91 (C(18)) 21.97 (C(17)) 25.21 (C(3)) 25.24 (C(11)) 26.60 (C(8)) 26.63 (C(14)) 28.58 (C(6)) 28.63 (C(5)) 28.68 (C(15)) 28.73 (C(4)) 29.04 (C(7)) 30.89 (C(16)) 33.98 (C(21)) 34.70 (C(22)) 35.27 (C(2)) 127.73 (C(10, 12)) 129.71 (C(9, 13)) (C(1)) 172.91 (C(20))

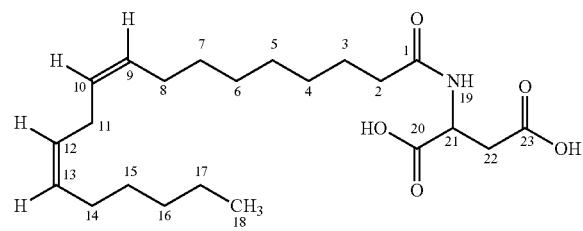 [SMILES: CCCCC/C=C\C/C=C\CCCCCCCC(=O)NC(CC(=O)O)C(=O)O]

2.6 Structure 28 Asp-C18:2

$^1$H NMR (600 MHz, DMSO-d$_6$) ? ppm 0.86 (t, J=6.87 Hz, 3H, H—C(18)) 1.17-1.38 (m, 14H, H—C(4, 5, 6, 7, 15, 16, 17) 1.42-1.50 (m, 2H, H—C(3) 2.01 (q, J=7.10 Hz, 4H, H—C(8, 14) 2.06-2.10 (m, 2H, H—C(2)) 2.48-2.55 (m, 1H, H—C(22)) 2.62-2.68 (m, 1H, H—C(22)) 2.73 (t, J=6.87 Hz, 2H, H—C(11)) 4.49 (d, J=6.53 Hz, 1H, H—C(21)) 5.18-5.42 (m, 4H, H—C(9, 10, 12, 13)) 8.09 (d, J=7.90 Hz, 1H, H—N(19))

$^{13}$C NMR (150 MHz, DMSO-d$_6$) ? ppm 13.93 (C(18) 21.97 (C(17)) 25.21 (C(3), 26.60 (C(11)) 26.65 (C(8)) 28.55 (C(14)) 28.59 (C(6)) 28.70 (C(4)) 28.73 (C(5)) 29.05 (C(15)) 30.69 (C(7)) 30.89 (C(16)) 35.06 (C(2)) 36.25 (C(22) 48.49 (C(21)) 127.75 (C(10, 12)) 129.74 (C(9, 13) 171.73 (C(20)) 172.02 (C(1)) 172.61 (C23))

2.7 Structure 33 Glu-C18:1

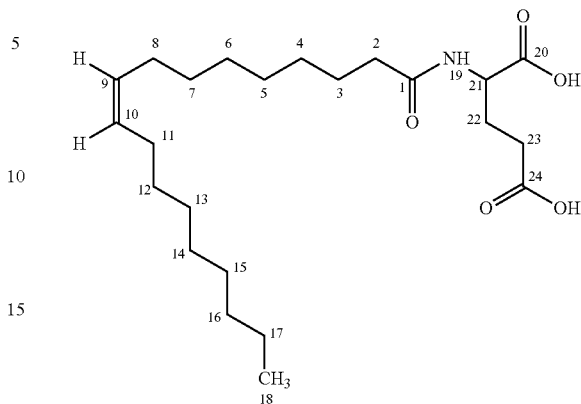

$^1$H NMR (600 MHz, CHLOROFORM-d) ? ppm 0.88 (t, J=7.05 Hz, 3H, H—C(18) 1.19-1.39 (m, 20H, H—C(4, 5, 6, 7, 12, 13, 14, 15, 16, 17) 1.56-1.68 (m, 2H, H—C(3)) 1.94-2.04 (m, 4H—C(8, 12)) 2.08 (dt, J=13.83, 6.66 Hz, 1H, H—C(22)) 2.20-2.25 (m, 3H, H—C(22)) 2.43-2.55 (m, 2H, H—C(23)) 4.64 (q, J=6.87 Hz, 1H, H—C(21)) 5.30-5.38 (m, 2H, H—C(9,10)) 6.70 (d, J=7.22 Hz, 1H, H—N(19))

$^{13}$C NMR (150 MHz, CHLOROFORM-d) ? ppm 14.13 (C(18) 22.69 (C(17)) 25.57 (C(3) 26.81 (C(22) 27.20 (C(11) 27.24 (C(8) 29.18 (C(6) 29.22 (C(4) 29.26 (C(5) 29.33 (C(13, 15) 29.55 (C(14)) 29.75 (C(7) 29.78 (C(12) 29.88 (C(23) 31.91 (C(16) 36.36 (C(2)) 51.60 (C(21)) 129.71 (C(10)) 130.02 (C(9) 174.62 (C(1) 175.66 (C(20) 177.95 (C(24))

2.8 Structure 37 Gln-C10:2

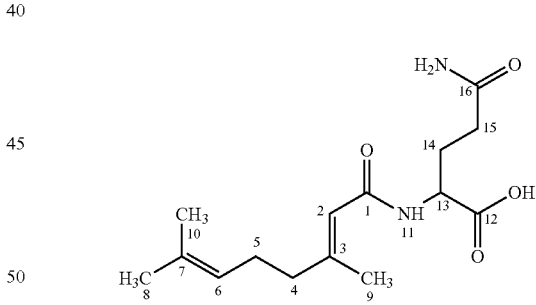

$^1$H NMR (600 MHz, CHLOROFORM-d) ? ppm 1.56-1.61 (s, 3H, H—C(10) 1.67 (s, 3H, H—C(8) 2.05-2.14 (m, 6H, H—C(4, 14, 15) 2.15-2.20 (m, 3H, H—C(9)) 2.39 (dd, J=15.46, 7.22 Hz, 2H, H—C(5)) 4.51 (d, J=6.19 Hz, 1H, H—C(13)) 5.01-5.13 (m, 1H, H—C(6) 5.60-5.72 (s, 1H, H—C(2)) 6.63 (br. s., 1H, H—N(11)) 7.14 (br. s., 2H, H$_2$—N))

$^{13}$C NMR (150 MHz, CHLOROFORM-d) ? ppm 17.69 (C(10) 18.52 (C(9) 25.67 (C(8) 26.17 (C(5) 30.95 (C(14)) 31.68 (C(15) 40.97 (C(4) 51.92 (C(13)) 117.22 (C(2) 123.14 (C(6) 132.39 (C(7) 156.33 (C(3) 167.95 (C(1) 174.69 (C(16) 177.12 (C(12))

2.9 Structure 44 Met-C12:1

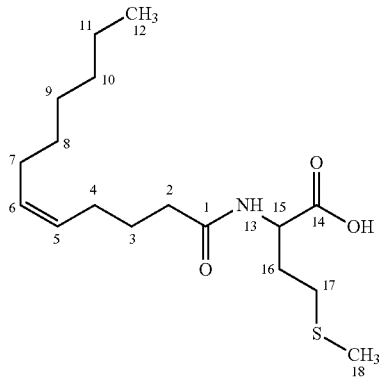 [SMILES: CCCCCC/C=C\CCCC(=O)NC(CCSC)C(=O)O]

$^1$H NMR (300 MHz, CD$_3$OD) ⍰ ppm 0.92 (t, J=6.9 Hz, 3H, H—C(12)), 1.32-1.38 (m, 8H, H—C(8, 9, 10, 11)), 1.63-1.73 (q, J=7.5 Hz, 2H, H—C(3)), 1.98-2.16 (m, 9H, H—C(4, 7, 16, 18), 2.28 (t, J=7.2 Hz, 2H, H—C(2)), 2.48-2.65 (m, 2H, H—C(17)), 4.56 (d, d, J=5.1, 9.9 Hz, 1H, 5H—C(15)), 5.33-5.46 (m, 2H, H—C(5, 6)).

$^{13}$C NMR (300 MHz, CD$_3$OD) ⍰ ppm 14.43 (C(12) 15.21 (C(18)) 23.71 (C(11)) 27.01 (C(4)) 27.70 (C(3)) 28.22 (C(7)) 30.08 (C(9)) 30.83 (C(17)) 31.31 (C(8)) 32.19 (C(16)) 32.95 (C(10)) 36.37 (C(2)) 52.59 (C(15)) 129.81 (C(5)) 131.80 (C(6)) 175.17 (C(14)) 176.28 (C(1))

2.10 Structure 46 Met-C18:1

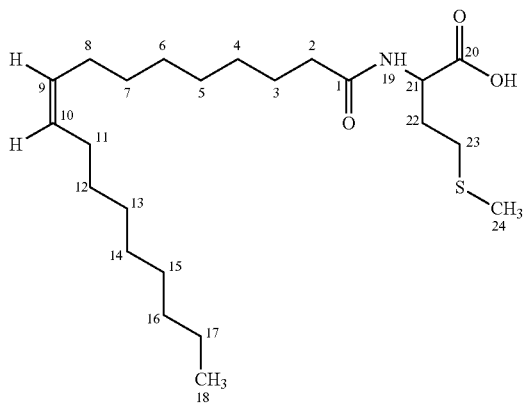 [SMILES: CCCCCCCC/C=C\CCCCCCCC(=O)NC(CCSC)C(=O)O]

$^1$H NMR (300 MHz, CD$_3$OD) ⍰ ppm 0.90 (t, J=6.6 Hz, 3H, H—C(18)), 1.27-1.34 (m, 20H, H—C(4, 5, 6, 7, 12, 13, 14, 15, 16, 17), 1.60-1.65 (m, 2H, H—C(3)), 1.90-2.19 (m, 9H, H—C(8, 11, 22, 24)), 2.25 et, J=6.3 Hz, 2H, H—C(C—H(2)), 2.49-2.62 (m, 2H, H—C(23)), 4.55 (d, d, J=4.8, 9.9 Hz, 1H, H—C(21)), 5.30-5.40 (m, 2H, H—C(9, 10).

$^{13}$C NMR (300 MHz, CD$_3$OD) ⍰ ppm 14.44 (C(18)), 15.24 (C(24)), 23.76 (C(17)) 26.96 (C(3)), 28.16 (C(11)), 30.26 (C(8)), 30.28 (C(6)), 30.37 (C(4)), 30.47 (C(5)), 30.62 (C(15)), 30.85 ((C13, 14)), 30.87 (C(23)), 31.33 (C(7, 12)), 32.18 (C(22)), 33.12 (C(16)), 36.84 (C(2)), 52.60 (C(21)), 131.22 (C(9, 10)), 175.20 (C(1)), 176.61 (C(20)).

2.11 Structure 51 Proline-C18:2

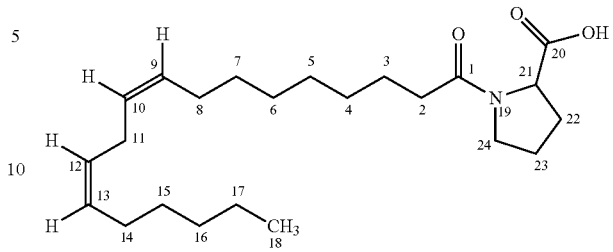

$^1$H NMR (600 MHz, CHLOROFORM-d) ⍰ ppm 0.78-0.85 (m, 3H, H—C(18)) 1.18-1.33 (m, 14H, H—C(4, 5, 6, 7, 15, 16, 17) 1.54-1.65 (m, 2H, H—C(3)) 1.84-1.92 (m, 1H, H_C(22)) 1.92-2.03 (m, 6H, H_C(8, 14, 23)) 2.26-2.32 (m, 2H, H—C(2)) 2.44 (ddd, J=12.29, 6.10, 2.92 Hz, 1H, H—C(22)) 2.70 (t, J=6.70 Hz, 2H, H—C(11)) 3.39 (td, J=9.62, 6.87 Hz, 1H, H—C(24)) 3.47-3.53 (m, 1H, H—C(24)) 4.53 (dd, J=8.08, 1.89 Hz, 1H, H—C(21)) 5.16-5.36 (m, 4H, H—C(9, 10, 12, 13))

$^{13}$C NMR (150 MHz, CHLOROFORM-d) ⍰ ppm 14.07 (C(18)) 22.57 (C(17)) 24.48 (C(3)) 24.79 C(23)) 25.62 (C(11)) 27.05 (C(22)) 27.17 (C(8)) 27.19 (C(14)) 29.10 C(6)) 29.27 (C(4, 15)) 29.34 (C(5)) 29.60 (C(7)) 31.51 C((16)) 34.45 C(2)) 47.98 C(24)) 60.25 (C(21)) 128.07 (C(12)) 128.07 (C(10)) 130.00 (C(9)) 130.24 C(13)) 171.87 (C(1)) 175.87 (C20))

2.12 Structure 55 Serine-18:2

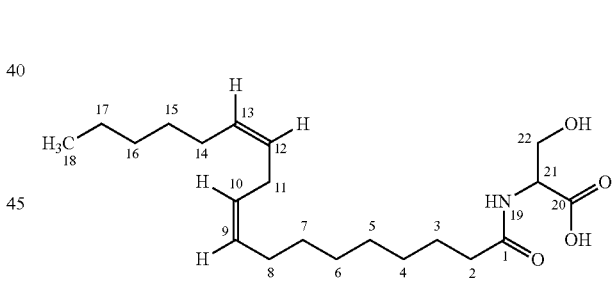

$^1$H NMR (600 MHz, DMSO-d$_6$) ⍰ ppm 0.85 (0=6.87 Hz, 3H, H—C(18) 1.18-1.35 (m, 16H, H—C(3, 4, 5, 6, 7, 15, 16, 17) 1.43-1.51 (m, 2H, H—C(2)) 2.01 (q, J=6.87 Hz, 4H, H—C(8, 14)) 2.12 (t, J=7.39 Hz, 2H, H—C(2) 2.73 (t, J=6.70 Hz, 2H, H—C(11)) 3.58 (dd, J=10.83, 4.30 Hz, 1H, H—C(22)) 3.65 (dd, J=10.83, 4.30 Hz, 1H, H—C(22) 4.21-4.27 (m, 1H, H—C(21)) 5.26-5.38 (m, 4H, H—C(9, 10, 12, 13)) 7.90 (d, J=7.90 Hz, 1H, H—N(19))

$^{13}$C NMR (150 MHz, DMSO-d$_6$) ⍰ ppm 13.91 (C(18)) 22.01 (C(17)) 25.22 (C(3)) 25.24 (C(11)) 26.63 (C(8)) 26.68 (C(14)) 28.65 (C(6)) 28.69 (C(4)) 28.77 (C(5. 15)) 20.09 (C(7)) 30.93 (C16)) 35.07 (C(2)) 54.55 (C(21)) 61.49 (C(22)) 127.74 (C(10, 12)) 129.72 (C(9, 13)) 172.19 (C(1)) 172.27 (C(20))

2.12 Structure 59 Leucine 16:1

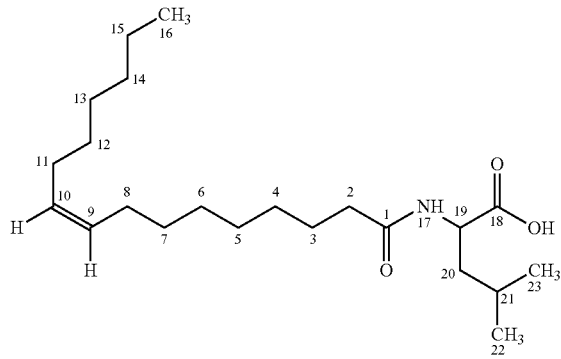 [SMILES: CCCCCC/C=C\CCCCCCCC(=O)NC(CC(C)C)C(=O)O]

¹H NMR (600 MHz, CHLOROFORM-d) ? ppm 0.85-0.90 (m, 3H, H—C(16)) 0.91-0.98 (m, 6H, H—C(22, 23)) 1.19-1.40 (m, 14H, H—C(4, 5, 6, 7, 12, 13, 14)) 1.49-1.75 (m, 7H, H—C(3, 15, 20, 21)) 2.01 (q, J=6.07 Hz, 4H, H—C(8, 11)) 2.24 (t, J=7.73 Hz, 2H, H—C(2)) 4.54-4.59 (m, 1H, H—C(19)) 5.24-5.43 (m, 2H, H—C(9, 10)) 6.14 (d, J=8.25 Hz, 1H, H—N(19))

¹³C NMR (150 MHz, CHLOROFORM-d) ? ppm 14.11 (C(16)) 21.9 (C(15) 22.66 (C(22) 22.86 (C(23) 24.91 (C(21)) 25.63 (C(3)) 27.18 (C(11)) 27.23 (C(8)) 28.99 (C(6)) 29.16 (C(4)) 29.20 (C(5)) 29.25 (C(13)) 29.71 (C(7)) 29.73 (C(12)) 31.79 (C(14)) 36.51 (C(2)) 41.32 (C(20)) 50.87 (C(19)) 129.73 (C(9)) 130.00 (C(10)) 173.95 (C(1)) 176.38 (C(18))

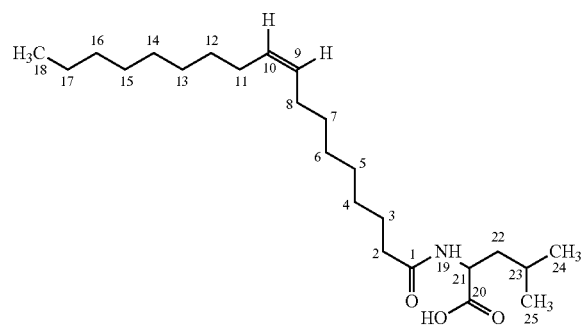 [SMILES: CCCCCCCC/C=C\CCCCCCCC(=O)NC(CC(C)C)C(=O)O]

2.13 Structure 61 Leu-C18:1

¹H NMR (600 MHz, CHLOROFORM-d) ? ppm 0.77-0.84 (m, 3H, H—C(18)) 0.85-0.93 (m, 6H, H—C(24, 25)) 1.14-1.29 (m, 20H, H—C(4, 5, 6, 7, 12, 13, 14, 15, 16, 17) 1.48-1.59 (m, 3H, H—C(3, 22) 1.60-1.69 (m, 2H, C—H(22, 23) 1.90-1.99 (m, 4H, H—C(8, 11)) 2.17 (t, J=7.39 Hz, 2H, H—C(2)) 4.55 (td, J=8.51, 4.64 Hz, 1H, H—C(21)) 5.15-5.35 (m, 2H, H—C(9, 10) 5.95 (d, J=7.56 Hz, 1H, H—N(19))

¹³C NMR (150 MHz, CHLOROFORM-d) ? ppm 13.68 (C(18)) 21.43 (C(17)) 22.24 (C(25) 22.40 (C(24) 24.45 (C(23)) 25.14 (C(3)) 26.74 (C(11) 26.78 (C(8)) 28.71 (C(6)) 28.73 (C(4)) 28.78 (C(5)) 28.88 (C(13, 15)) 29.09 (C(14)) 29.26 (C(7)) 31.46 (C(16)) 36.04 (C(2)) 40.70 (C(22)) 50.41 (C(21)) 129.28 (C(9, 10) 173.64 (C(1) 176.11 (C(20))

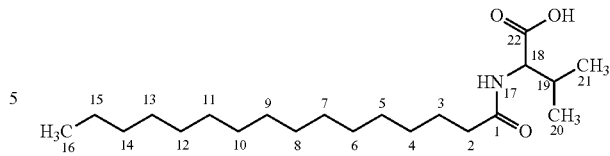

Structure 65 Val-C16:0

¹H NMR (600 MHz, CHLOROFORM-d) ? ppm 0.88 (0=7.05 Hz, 3H, H—C(16)) 0.95 (d, J=6.87 Hz, 3H, H—C(21)) 0.98 (d, J=6.87 Hz, 3H, H—C(20)) 1.19-1.37 (m, 24H, H—C(3, 4, 5, 6, 7, 8, 9, 10, 11, 12, 13, 14) 1.59-1.71 (m, 2H, H—C(3)) 2.20-2.32 (m, 3H, H—C(3)) 4.59 (dd, J=8.59, 4.81 Hz, 1H, H—C(18)) 6.19 (d, J=8.59 Hz, 1H, H—N(17))

¹³C NMR (150 MHz, CHLOROFORM-d) ? ppm 14.13 C(16)) 17.70 C(20)) 19.02 C(21)) 22.71 C(15)) 25.78 C(3)) 29.25 C(6)) 29.35 C(9)) 29.38 (C(13) 29.52 C(5)) 29.64 C(4)) 29.68 (C(7, 10)) 29.72 C(8, 11, 12)) 31.00 (C(19)) 31.94 (C(14)) 36.69 (C(2)) 57.08 C(18)) 174.23 (C(1)) 175.49 C(22)

APPLICATION EXAMPLES

Test on Tang (High Intensity Sweetener HIS Masking)

In an orange flavoured Tang powdered soft drink (market product) sweetened with sucrose plus high intensity sweetener (aspartame and acesulfame-K) and containing citric acid, C18:2-gaba and C18:2-pro were tested.

All samples were evaluated by expert tasters. Tasters were asked to describe the samples focusing on authentic taste, masking off notes of high intensity sweetener, mouthfeel & body, enhancement, richness, juiciness, long lastingness, salivation, sweetness Base is Orange Flavoured Tang Base: sweet, orange, licorice, and lingering high intensity sweetener off-notes, bitter, thin Base plus C18:2-gaba at 0.5 ppm: the off-notes of the high intensity sweetener were suppressed. Additionally, the sweet juicy orange notes and mouthfeel are enhanced Base plus C18:2-Pro at 1 ppm: the off-notes of the high intensity sweetener were suppressed. Additionally, the fresh, sweet juicy orange notes are enhanced, characteristic of authentic fresh orange fruit.

Test on Soy Milk (Soy Protein Masking)

In a soy milk (1.8% fat) sweetened with 5% sucrose by weight, flavoured with a proprietary milk flavour at a dosage of 0.1%, C18:2-gaba was added at 2 ppm Samples were evaluated by expert tasters. Tasters were asked to describe the samples focusing on authentic taste, masking of soy protein off notes, mouthfeel, fullness, salivation, sweetness, richness, long lastingness and fattiness.

Soy milk, 5% sucrose, milk flavor @0.1%: sweet, dry, green, soy bean taste

Soy milk, 5% sucrose, milk flavor @0.1%, C18:2-gaba at 2 ppm: good reduction of the undesirable soy bean off-taste, clean, rich, creamy and milky.

Test on Liquid Margarine (KCL Masking)

In Blueband liquid margarine (market product) with added KCL 0.8% and a proprietary masking flavour @0.01% 18:2 gaba was added at 2 ppm.

Samples were evaluated by expert tasters. Tasters were asked to describe the samples focusing on authentic taste, masking of KCL off notes, mouthfeel, saltiness, fullness, salivation, long lastingness and fattiness.

Base is Blueband, 0.8% KCL, proprietary masking @0.01%

Base: metallic, buttery, bitter and soapy

Base plus C18:2-gaba at 2 ppm. The composition was considered to exhibit a more saltiness, more mouthfeel, less metallic and bitter notes, more authentic butter.

The invention claimed is:

1. A method of masking or modulating an undesired taste or off-taste contained in an edible composition, the method comprising the step of:
   including in the edible composition 1 ppb -10 ppm of a compound selected from the group consisting of:
   N-geranoyl-Pro,
   N-palmiteneoyl-Pro,
   N-stearoyl-Pro,
   N-oleoyl-Pro,
   N-linoleoyl-Pro,
   N-linolenoyl-Pro;
   N-geranoyl-Met,
   N-palmitoyl-Met,
   N-palmitenoyl-Met,
   N-stearoyl-Met,
   N-oleoyl-Met,
   N-linoleoyl-Met,
   N-linolenoyl-Met,
   and edible salts thereof selected from chlorides, sulphates, phosphates, gluconates, sodium, citrates, carbonates, acetates and lactates.

2. An edible composition comprising an ingredient which imparts an undesired taste or off-taste, and a compound present in the edigle composition in a concentration of 1 ppb-10 ppb selected from the group consisting of:
   N-geranoyl-Pro,
   N-palmiteneoyl-Pro,
   N-stearoyl-Pro,
   N-oleoyl-Pro,
   N-linoleoyl-Pro,
   N-linolenoyl-Pro;
   N-geranoyl-Met,
   N-palmitoyl-Met,
   N-palmitenoyl-Met,
   N-stearoyl-Met,
   N-oleoyl-Met,
   N-linoleoyl-Met,
   N-linolenoyl-Met,
   and edible salts thereof selected from chlorides, sulphates, phosphates, gluconates, sodium, citrates, carbonates, acetates and lactates.

3. An edible composition according to claim 2 wherein the ingredient which imparts an undesired or off-taste is selected from the group consisting of:
   flavanoids, polyphenols, peptides, minerals, terpenes, caffeine, taurine, carnitine, glucorolactone, guarana, vitamins, minerals, amino acids, proteins or protein analogs, peptides, antioxidants, KCl, soy, a soy-based ingredient, sugar substitutes selected from natural sweeteners, and synthetic high intensity sweeteners, dairy substitutes, pharmacological actives, enzyme modified cheese, oral care actives selected from, chlorohexidine (gluconate), cetyl pyridinium chloride, tego-betaine and metal salts selected from stannous salts and zinc salts, whey, casein, tannins, products selected from coffee products, tea products, mouthwash and toothpaste, and preservatives selected from sodium benzoate and potassium sorbate.

4. An edible composition according to claim 3 wherein said ingredient is a natural sweetener selected from: sucrose, high fructose corn syrup, fructose and glucose, or is a high intensity, non-nutritive sweetener selected from: aspartame, acesulfame K, sucralose, cyclamate, sodium saccharin, neotame, and rebaudioside A.

5. An edible composition according to claim 3 wherein the ingredient is soy or a soy-based ingredient.

6. An edible composition according to claim 2 in the form of a powdered soft drink or a dry mix composition.

7. An edible composition according to claim 2 in the form of a snack food.

8. An edible composition according to claim 2 in the form of an alcoholic beverage.

9. An edible composition according to claim 2 in the form of an orally administrable tablet, capsule, powder or multi-particulate.

10. An edible composition according to claim 2 in the form of a caloric or non-caloric beverage containing a natural sweetener selected from: sucrose, high fructose corn syrup, fructose and glucose, or a high intensity, non-nutritive sweetener selected from: aspartame, acesulfame K, sucralose, cyclamate, sodium saccharin, neotame, rebaudioside A, and/or other stevia-based sweeteners.

11. An edible composition according to claim 2 containing a soy-protein.

12. An edible composition according to claim 2 containing KCl.

13. A stock solution formulated to be added to a foodstuff composition or a beverage composition, the stock solution comprising a compound selected from the group consisting of:
    N-geranoyl-Pro,
    N-palmiteneoyl-Pro,
    N-stearoyl-Pro,
    N-oleoyl-Pro,
    N-linoleoyl-Pro,
    N-linolenoyl-Pro;
    N-geranoyl-Met,
    N-palmitoyl-Met,
    N-palmitenoyl-Met,
    N-stearoyl-Met,
    N-oleoyl-Met,
    N-linoleoyl-Met,
    N-linolenoyl-Met,
    and edible salts thereof selected from chlorides, sulphates, phosphates, gluconates, sodium, citrates, carbonates, acetates and lactates.

14. A stock solution according to claim 13, wherein the stock solution is formulated to be added to an edible composition to provide the compound in an ultimate concentration of 1 ppb -10 ppm of the compound in the edible composition.

15. A stock solution according to claim 13, wherein the stock solution is effective in masking or modulating an undesired taste or off-taste caused by a natural sweetener selected from: sucrose, high fructose corn syrup, fructose and glucose, or a high intensity, non-nutritive sweetener selected from: aspartame, acesulfame K, sucralose, cyclamate, sodium saccharin, neotame, rebaudioside A, and/or other stevia-based sweeteners, contained in an edible composition, when the compound is present in the edible composition at a concentration of 1 ppb -10 ppm of the edible composition.

16. A stock solution according to claim 13, wherein the stock solution is effective in masking or modulating an undesired taste or off-taste caused by a soy-based product, contained in an edible composition, when the compound is present in the edible composition at a concentration of 1 ppb -10 ppm of the edible composition.

17. A stock solution according to claim 13, wherein the stock solution is effective in masking or modulating an undesired taste or off-taste caused by KCl, contained in an edible composition, when the compound is present in the edible composition at a concentration of 1 ppb -10 ppm of the edible composition.

\* \* \* \* \*